(12) United States Patent
Takahashi

(10) Patent No.: US 6,188,848 B1
(45) Date of Patent: Feb. 13, 2001

(54) CAMERA HAVING A DATA IMPRINTING DEVICE

(75) Inventor: Hiroyuki Takahashi, Tochigi (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/414,064

(22) Filed: Oct. 7, 1999

(30) Foreign Application Priority Data

Oct. 7, 1998 (JP) ................................................. 10-285347

(51) Int. Cl.$^7$ .............................. G03B 17/24; G03B 1/00
(52) U.S. Cl. ........................................... 396/315; 396/410
(58) Field of Search .................................... 396/310, 311, 396/315–320, 406, 410

(56) References Cited

U.S. PATENT DOCUMENTS 5,543,872 * 8/1996 Gotot et al. ........................... 396/319
5,862,421   1/1999 Suzuki et al. .

FOREIGN PATENT DOCUMENTS 63-177120   7/1988 (JP) .

* cited by examiner

*Primary Examiner*—David M. Gray
(74) *Attorney, Agent, or Firm*—Greenblum & Bernstein, P.L.C.

(57) ABSTRACT

A camera having a data imprinting function, includes: a motorized film transport device for winding and rewinding a film having consecutive sprocket holes; a sprocket-hole detecting device which detects that each of the sprocket holes passes a predetermined position; a memory in which photographic data of a frame of the film is stored at a shutter release; a data imprinting device which reads out one of the photographic data stored in the memory therefrom to imprint one character of the photographic data on a corresponding frame of the film between two adjacent sprocket holes of the corresponding frame; a film moving amount detector for detecting an amount of movement of part of the film which extends from the trailing edge of the last frame of the film to the end of the film, in accordance with detection of the sprocket-hole detector; wherein the amount of movement, which is detected by the film moving amount detector, is stored in the memory; a frame edge detector which detects the trailing edge of the last frame when the film is rewound by the motorized film transport device in accordance with the amount of movement stored in the memory. The data imprinting device starts imprinting each of the photographic data stored in the memory on a corresponding frame of the film with reference to the trailing edge of the last frame detected by the frame edge detector, in accordance with detection of the sprocket-hole detector.

9 Claims, 22 Drawing Sheets

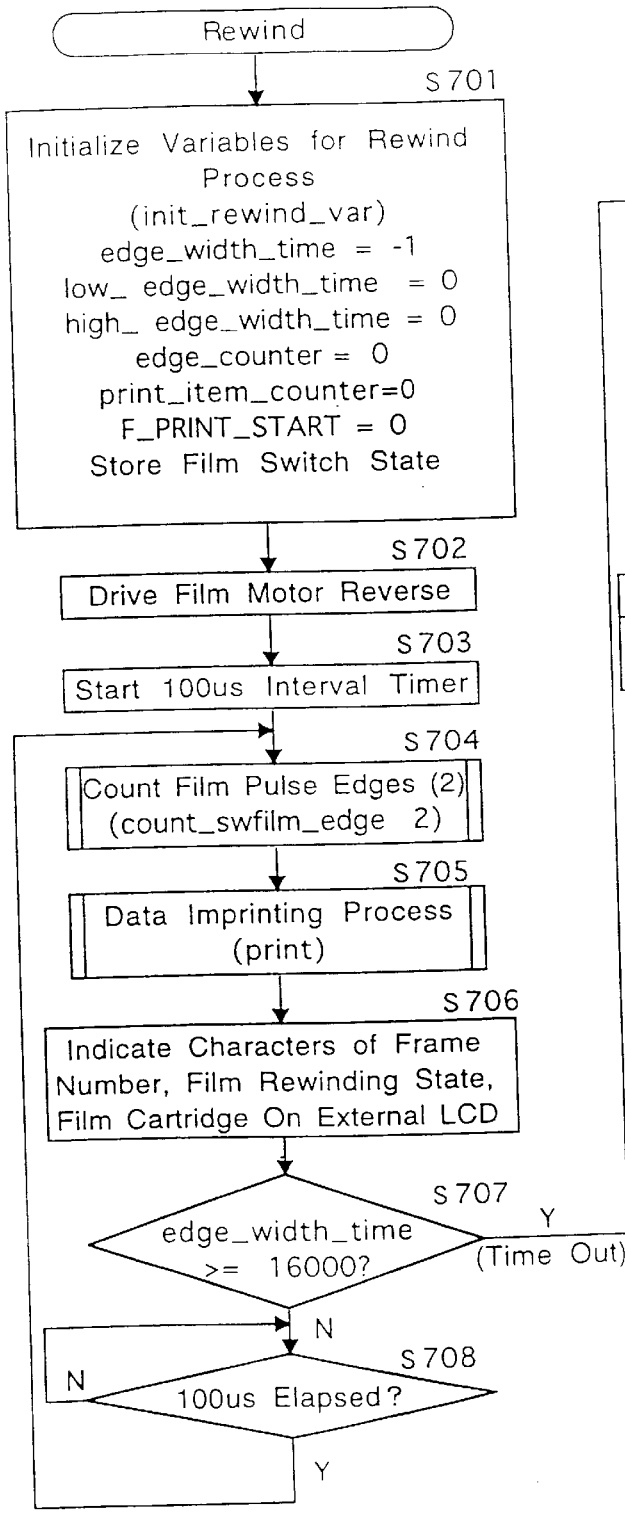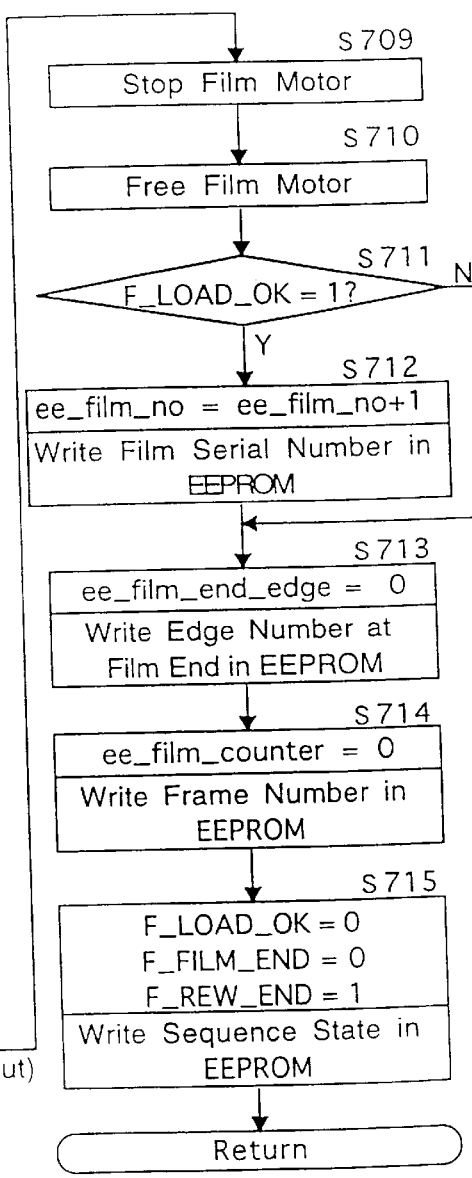
Fig. 13

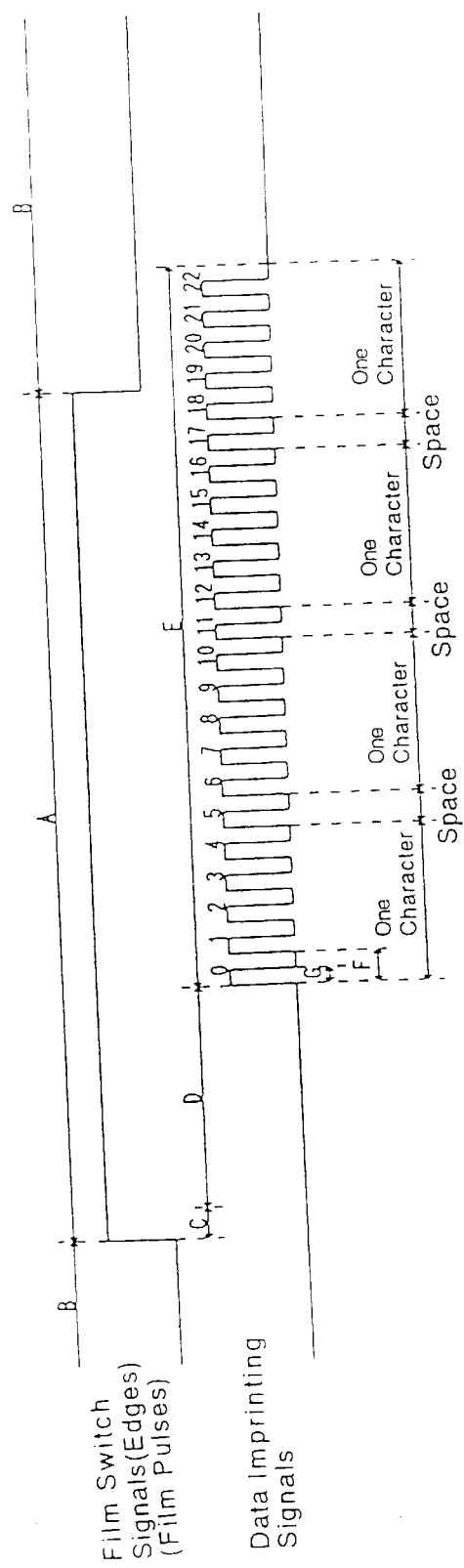

CAMERA HAVING A DATA IMPRINTING DEVICE

BACKGROUND OF THE INVENTION

1. Field of the Invention

The present invention relates to a camera provided with data imprinting device for imprinting photographic data such as a date, time, shutter speed, aperture value, etc., on film.

2. Description of the Related Art

A camera provided with a data imprinting device which stores photographic data such as a date, time, shutter speed, aperture value, etc., in a memory each time the shutter is released and subsequently reads out the stored data to imprint the same on film in predetermined areas thereof at the time of rewinding the film, is known in the art. In such a camera, it is necessary to detect the trailing edge of the last frame in order to imprint photographic data on each frame precisely in a predetermined area thereof. A method of detecting the trailing edge of the last frame is disclosed in Japanese Laid-open Patent Publication No.63-177120 in which two pulses of different phases are generated by a mechanism composed of a gear, a printed circuit board, and a brush which slidably contacts the printed circuit board. The gear rotates in accordance with the movement of the film to rotate the brush relative to the printed circuit board so that the levels of the two pulses become high simultaneously only at each moment the border between two adjacent frames passes a predetermined position. The trailing edge of the last frame is detected at the time of rewinding the film by monitoring the levels of the two pulses. However, since there is a certain period of time required for the levels of the two pulses to become high simultaneously, the trailing edge of the last frame cannot be detected precisely. Accordingly, such a conventional method of detecting the trailing edge of the last frame is not suitable for the case where photographic data is imprinted on film in a narrow area between two adjacent sprocket holes thereof.

SUMMARY OF THE INVENTION

The primary object of the present invention is to provide a camera having a data imprinting device which can imprint photographic data on each frame precisely and accurately in a predetermined area between two adjacent sprocket holes thereof at the time of rewinding the film.

To achieve the object mentioned above, according to an aspect of the present invention, there is provided a camera having a data imprinting function, including: a motorized film transport device for winding and rewinding a film having consecutive sprocket holes; a sprocket-hole detecting device which detects that each of the sprocket holes passes a predetermined position; a memory in which photographic data of a frame of the film is stored at a shutter release; a data imprinting device which reads out one of the photographic data stored in the memory therefrom to imprint one character of the photographic data on a corresponding frame of the film between two adjacent sprocket holes of the corresponding frame; a film moving amount detector for detecting an amount of movement of part of the film which extends from the trailing edge of the last frame of the film to the end of the film, in accordance with detection of the sprocket-hole detector, wherein the amount of movement, which is detected by the film moving amount detector, is stored in the memory; a frame edge detector which detects the trailing edge of the last frame when the film is rewound by the motorized film transport device in accordance with the amount of movement stored in the memory. The data imprinting device starts imprinting each of the photographic data stored in the memory on a corresponding frame of the film with reference to the trailing edge of the last frame detected by the frame edge detector, in accordance with detection of the sprocket-hole detector.

Preferably, the sprocket-hole detector detects that each of the sprocket holes passes the predetermined position by detecting the consecutive edges of the sprocket holes.

Preferably, the data imprinting device determines a position of commencement of imprinting each of the photographic data with reference to the trailing edge of the last frame detected by the frame edge detector, in accordance with the amount of movement stored in the memory.

Preferably, there is further included a counter for counting the sprocket holes detected by the sprocket-hole detector; wherein the film moving amount detector detects the amount of movement of the part of the film in accordance with the number of the sprocket holes counted by the counter.

Preferably, the memory includes a non-volatile memory.

Preferably, the film moving amount detector determines that the film is fully wound up to the end of the film when the film is rewound by the motorized film transport device after the shutter release if the sprocket-hole detector only detects a number of the sprocket holes which is fewer than a predetermined number of the sprocket holes provided on each frame of the film within a predetermined period of time.

Preferably, there is further provided a film speed detecting device which detects the speed of the film; wherein the data imprinting device determines a position of commencement of imprinting the each of the photographic data in accordance with the time of detection of the sprocket-hole detector and the film speed detected by the film speed detecting device.

Preferably, the sprocket-hole detector includes a sprocket having a plurality of projections engageable with the sprocket holes.

Preferably, the data imprinting device includes an LED light emitter having an array of multiple-dots.

The present disclosure relates to subject matter contained in Japanese Patent Application No.10-285347 (filed on Oct. 7, 1998) which is expressly incorporated herein by reference in its entirety.

BRIEF DESCRIPTION OF THE DRAWINGS

The present invention will be described below in detail with reference to the accompanying drawings in which:

FIG. 13 is a flow chart of the rewinding process of the camera shown in FIG. 1 in which the data imprinting process is performed;

FIG. 20 is an enlarged view of part of the time chart shown in FIG. 19; and

DESCRIPTION OF THE PREFERRED EMBODIMENT

Figure 1:
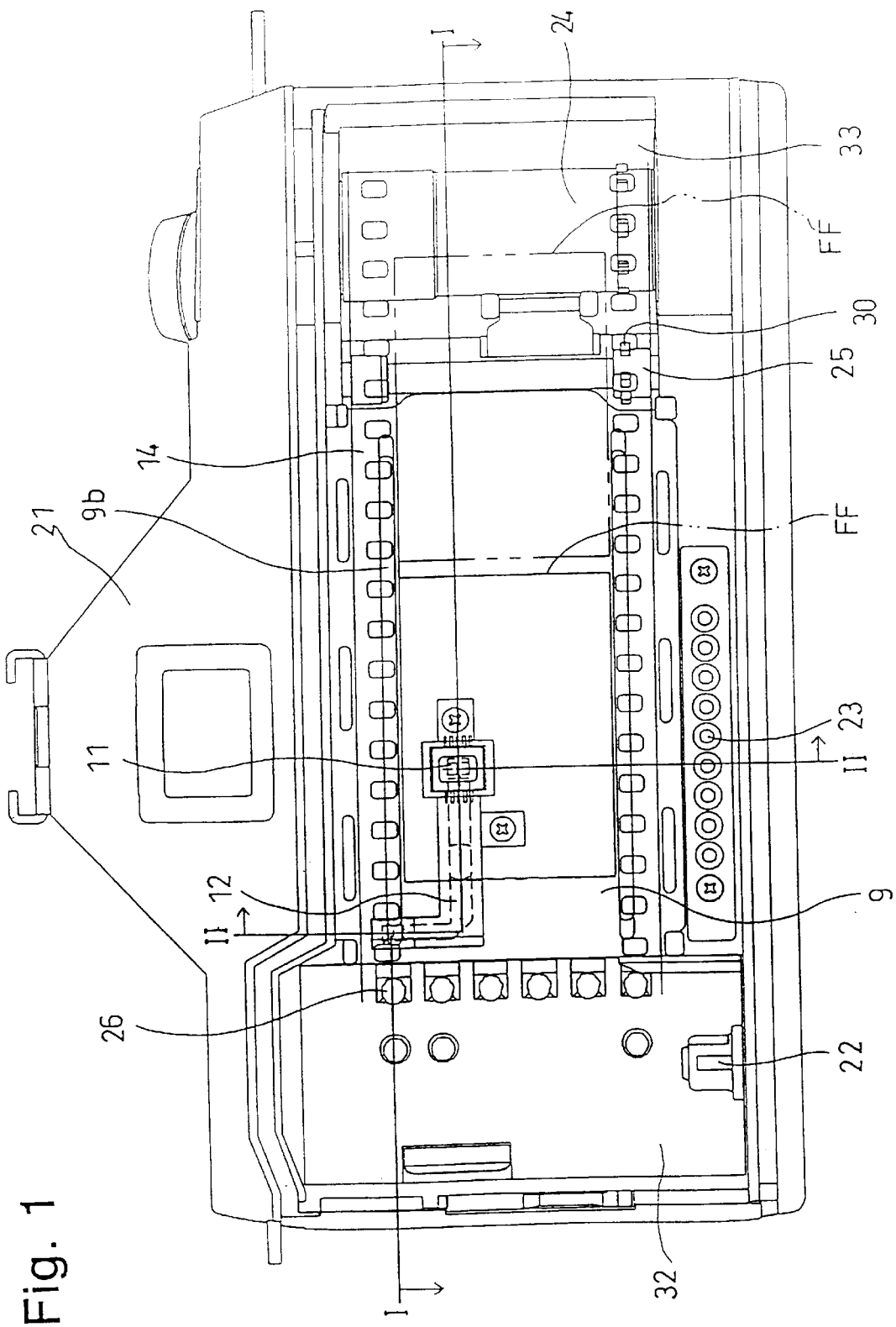
FIG. 1 is a rear elevational view of a camera to which the present invention is applied with the back lid of the camera open.
Figure 2:
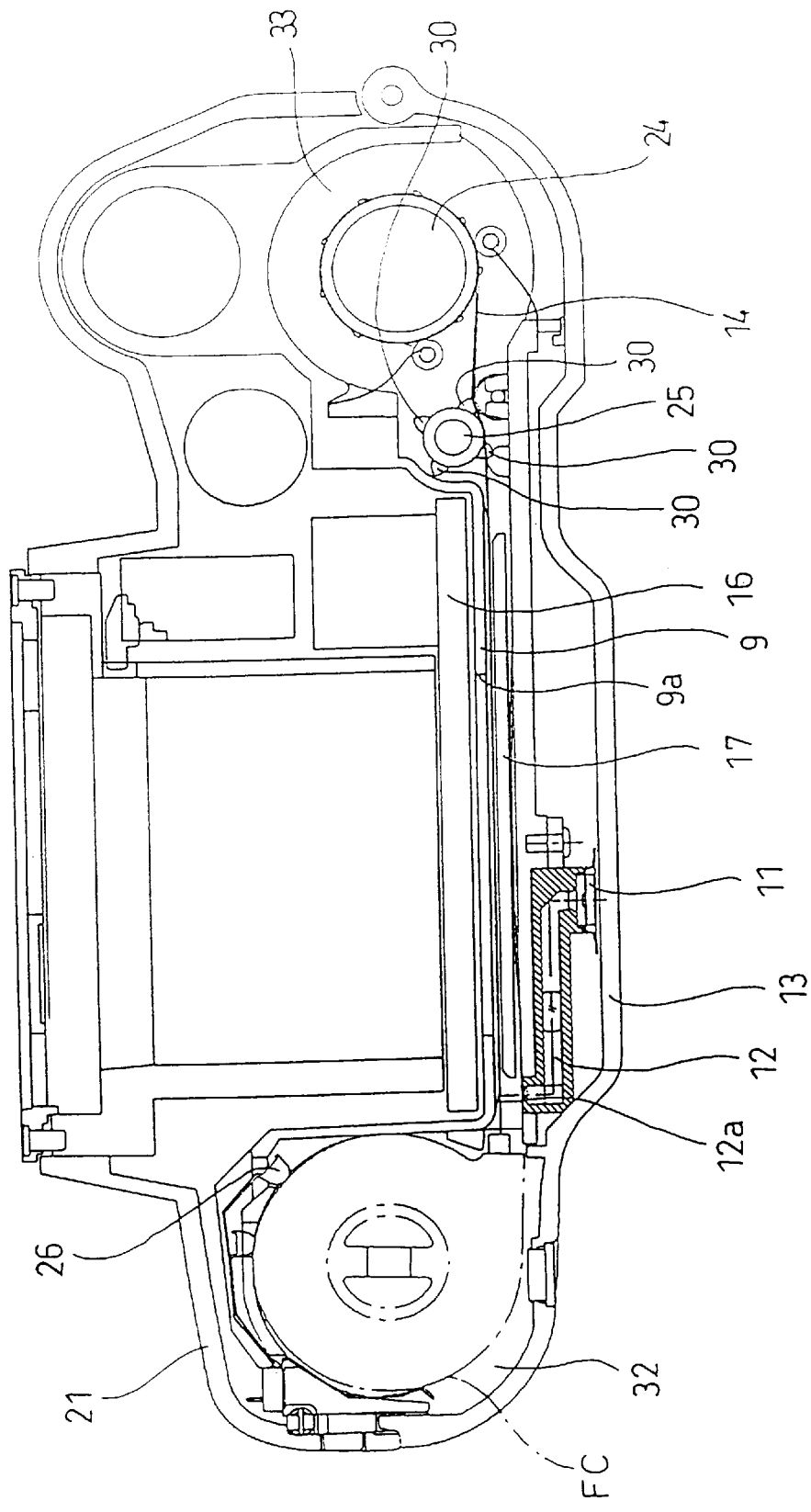
FIG. 2 is a cross sectional view of the camera shown in FIG. 1, taken along the I—I line, viewed in the direction of the appended arrows.
Figure 3:
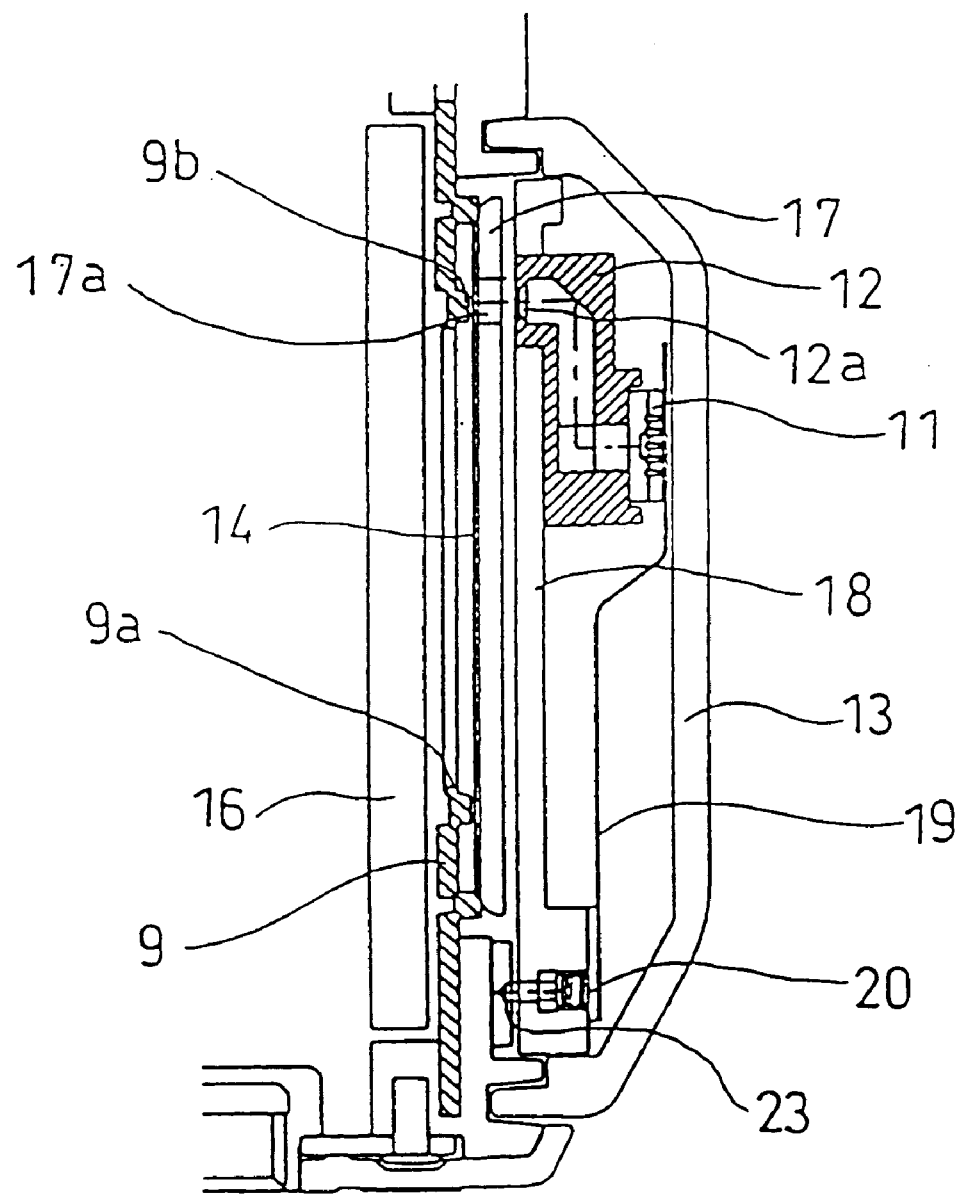
FIG. 3 is a cross sectional view of the camera shown in FIG. 1, taken along the II—II line, viewed in the direction of the appended arrows.

FIG. 1 shows an embodiment of an SLR camera with the hack lid thereof open. The SLR camera is provided with an electronic control circuit which controls the exposure operation, the shutter release operation and other operations of the camera. The SLR camera is provided with a data imprinting device which is composed of an LED character generator 11 and a light guide optical system 12. Although the data imprinting device is mounted on the back lid 13 (see FIG. 2) which is rotatably connected to a camera body 21, the data imprinting device is shown in FIG. 1 for the purpose of illustration. FIG. 2 is a cross sectional view of the camera, taken along the I—I line, viewed in the direction of the appended arrows. The camera body 21 is provided at the left and right ends thereof with a film chamber 32 and a spool chamber 33, respectively, as viewed in FIG. 1. A film cartridge FC, shown by a one-dot chain line in FIG. 2, is loaded in the film chamber 32, while a film take-up spool 24 is positioned in the spool chamber 33. The camera is provided in the film chamber 32 with a rewind is shaft 22 and DX-information pins 26. The total number of DX-information pins 26 are nine; the right row includes six pins and the left row includes three pins as viewed in FIG. 1. A sprocket 25 which is engaged with sprocket holes of a film (roll film) 14 to detect the movement of the sprocket holes is positioned on the immediate left side of the spool chamber 33 as viewed in FIG. 1, so that the upper and lower ends of the sprocket 25 are rotatably held by the camera body 21. The camera is provided between the film chamber 32 and the spool chamber 33 with a shutter unit 16 (see FIG. 2). The camera is further provided, in the back of the camera body 21 at a lower center thereof, with an array of contacts 23. The back lid 13 is provided with a corresponding array of pins 20 (only one of them is shown in FIG. 3) which are brought into contact with the array of contacts 23 upon the back lid 13 being closed. Electrical signals can be sent from the camera body 21 to the back lid 13 and vice versa via the array of contacts 23 and the array of pins 20.

FIG. 3 shows a cross sectional view of part of the camera with the back lid 13 being closed, viewed from the left side of the camera as viewed in FIG. 1. The back lid 13 is provided with a pressure plate 17 which maintains the flatness of the film 14, and a base plate 18. The back lid 13 is further provided between the base plate 18 and the back lid 13 with the LED character generator 11 and the light-guide optical system 12, which are fundamental elements of the data imprinting device. The character generator 11 is provided with an LED light emitter having multiple-dots (e.g. 7 dots) aligned vertically to emit light in accordance with character information. The light-guide optical system 12 leads the light emitted by the character generator 11 to a character imprinting portion 12a (the exit surface of the light-guide optical system 12). The light-guide optical system 12 is provided with a plurality of reflecting surfaces which change the arrangement of the array of multiple-dots to in appropriate arrangement at an imprinting position on the film 14. A tiny window or opening (see FIG. 3) 17a is formed on the pressure plate 17 at a position opposed to an upper inner film guide rail 9b formed on an aperture frame 9 having a rectangular photographic aperture 9a. The upper inner film guide rail 9b is formed on the aperture frame 9 so that the sprocket holes formed on the upper side of the film 14 therealong as viewed in FIG. 1 travel on the upper inner film guide rail 9b. As can be seen in FIG. 3, the character imprinting portion 12a of the light-guide optical system 12 is positioned behind the tiny window 17a.

Figure 5:
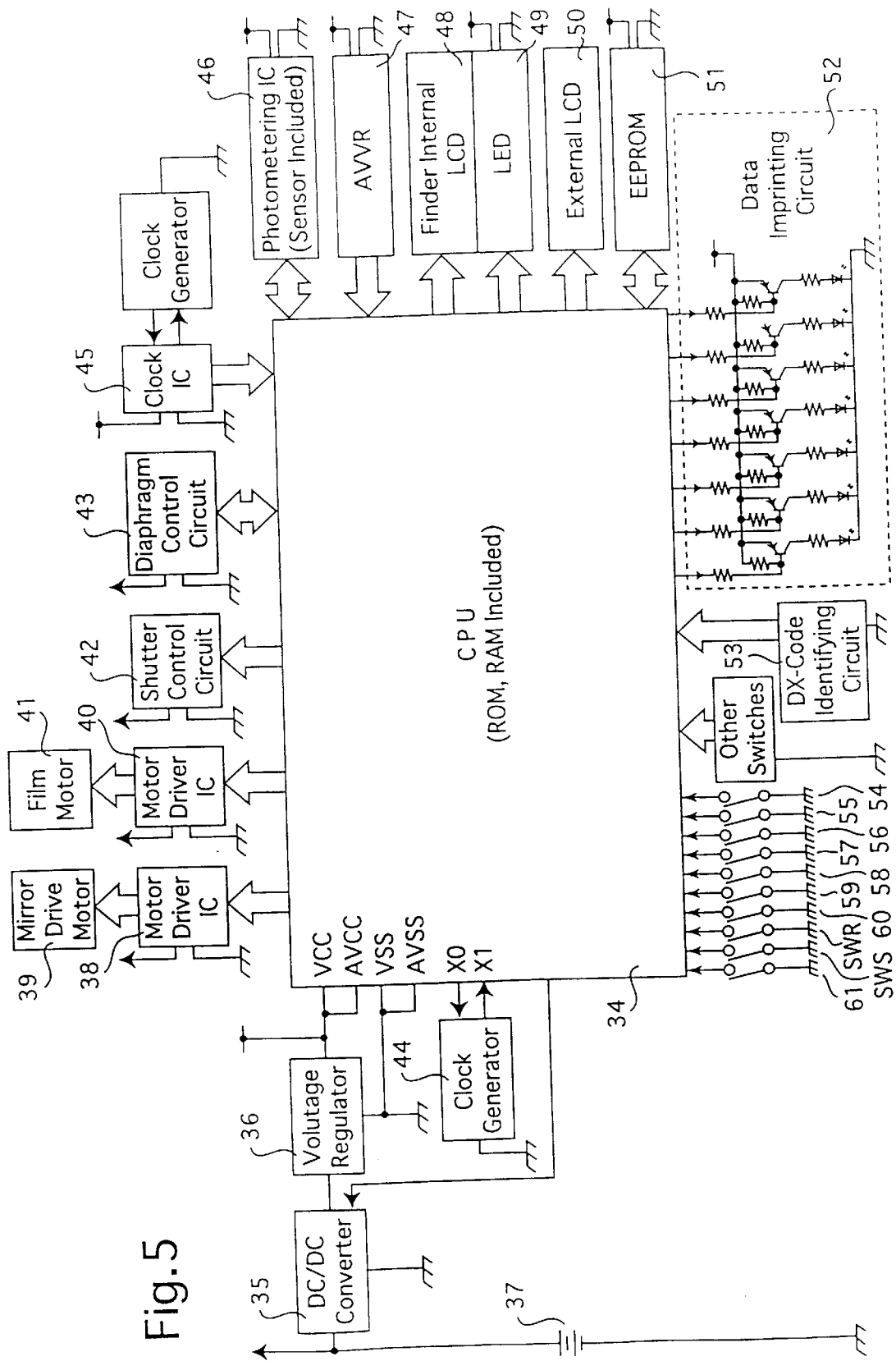
FIG. 5 is a block diagram of a control circuit of the camera shown in FIG. 1.

The character generator 11 emits light to be projected towards the film 14 between two adjacent sprocket holes to be exposed thereon in accordance with character information output from a CPU 34 (see FIG. 5). The emitted light carries a certain image of a pattern of characters and is incident on the back of the film 14 via the light-guide optical system 12 and the tiny window 17a to thereby imprint the photographic data on the film 14 as a latent image.

The back lid 13 is provided in a lower portion thereof with the aforementioned array of pins 20. The pins 20 are electrically connected with the character generator 11 via a flexible wiring board 19 (see FIG. 3) so that electrical signals can be sent from the camera body 21 to the character generator 11 via the flexible wiring board 19, the array of pins 20 and the array of contacts 23.

Figure 4:
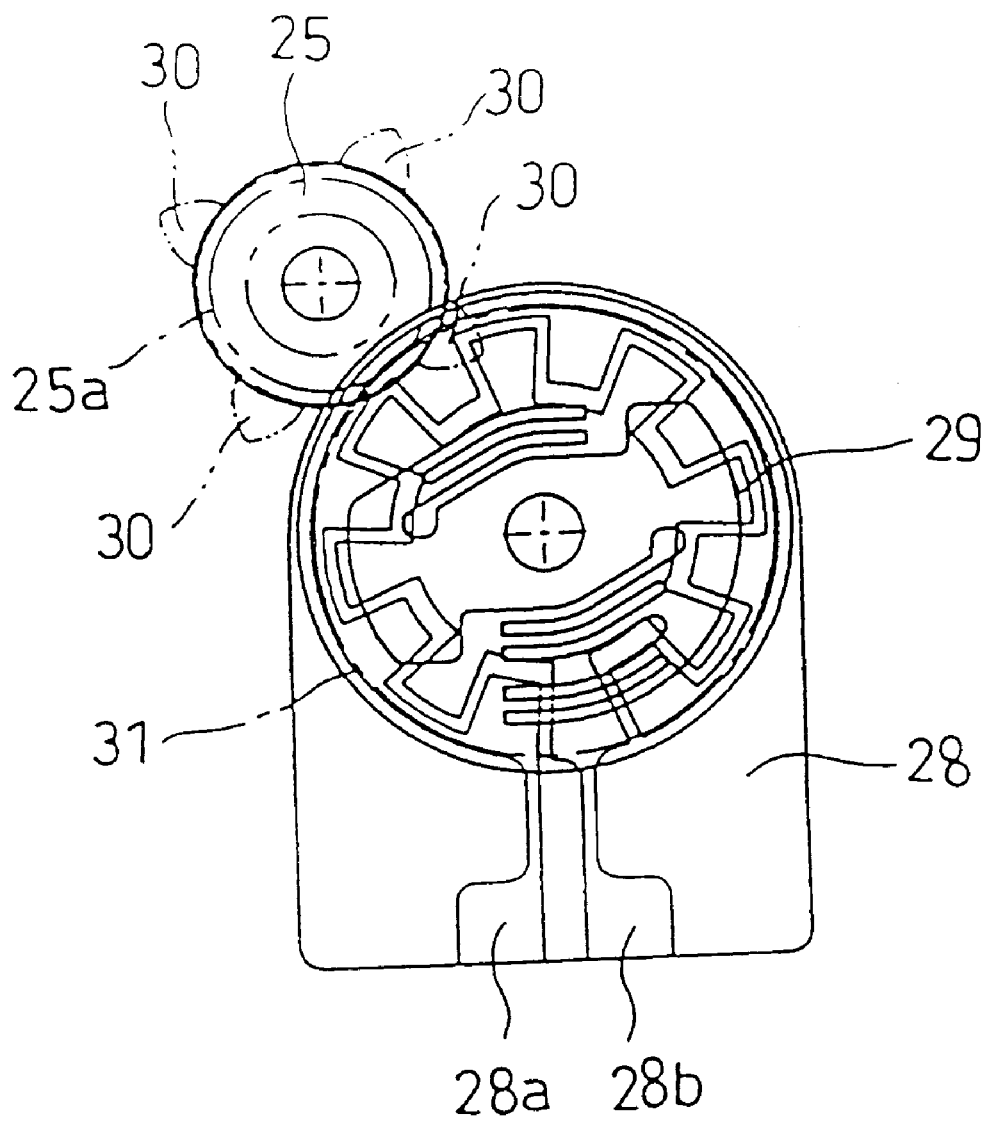
FIG. 4 is a plan view of a sprocket-hole detecting device of the camera shown in FIG. 1.

Referring to FIG. 4, the sprocket 25 is provided around the lower end thereof with four projections 30 which extend radially and outwardly at regular intervals. At least one of the four projections 30 is engaged with any sprocket hole of the film 14 (see FIG. 2) at a time, so that the sprocket 25 rotates while the film 14 is wound or rewound. The sprocket 25 is provided at one end thereof with a gear 25a which is in constant mesh with a gear 31 to which a brush 29 is fixed. The brush 29 is positioned on a detector board 28 to contact a predetermined code pattern printed thereon. Therefore, rotation of the sprocket 25 causes the brush 29 to rotate and slide on the code pattern of the detector board 28. With this mechanism, rotation of the sprocket 25 is detected. In other words, the sprocket 25, the projections 30, the gear 31, the detector board 28, the brush 29, and the CPU 34 constitute a film moving detector. Each time the brush 29 rotates by a predetermined angle of rotation, two output terminals 28a and 28b on the detector board 28 are electrically connected and disconnected alternately. One of the output terminals 28a and 28b is grounded, so that the level of the signal output from the other output terminal alternately changes between a high level and a low level; this electric device is hereinafter referred to as film switch 58 (see FIG. 5). The CPU 34 (which functions as a film speed detecting device) detects the variation in level of the signal output from the other output terminal 28a or 28b as pulses (film pulses) generated by the movement of the film 14.

Figure 19:
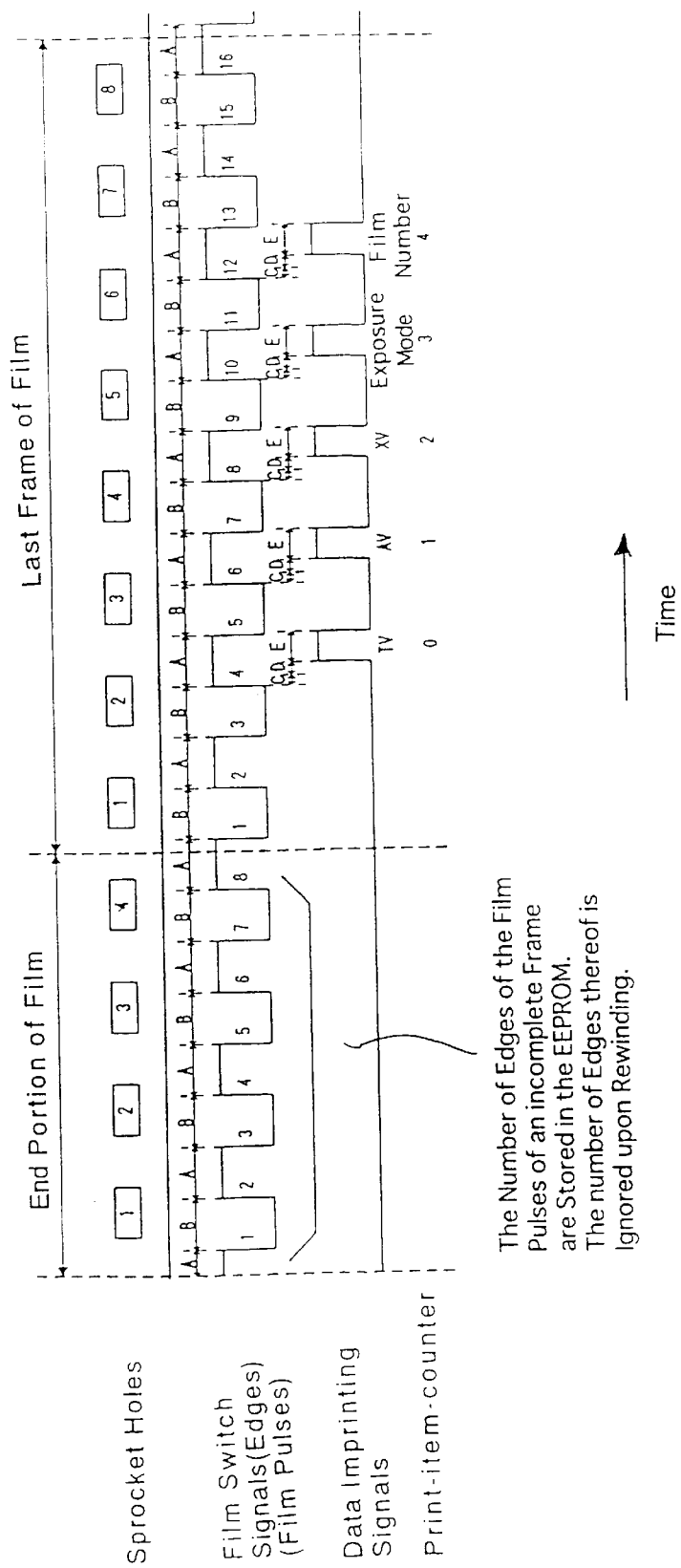
FIG. 19 is a time chart showing a correlation between sprocket holes of film and each film pulse in the camera to which the present invention is applied.

The last frame of the film 14 when fully wound is shown in FIG. 19, as viewed from the underside of the film 14. Upon completion of a photographic operation, it is possible that the film can only be wound out by an amount less than one frame wherein the end portion of the film 14 has been reached, so that no more film can be drawn out from the cartridge FC. The film 14 reaches the end portion thereof upon the film 14 being completely wound, and the last frame of the film 14 becomes the last photographic frame. Accordingly, the last photographic frame is referred to as the final frame, and the number of sprocket holes of the end portion of the film 14 detected from the final frame until the completion of winding of the film 14 is equivalent to the amount of movement of the film 14 from the edge of the photographic frame to the final edge of the film 14.

FIG. 19 shows a time chart illustrating a correlation between the sprocket holes of the film 14 and each film pulse, in the case of imprinting photographic data on the film 14 between two adjacent sprocket holes thereof upon the film 14 being rewound. The horizontal axis of the time chart represents time. Each film frame FF has eight consecutive sprocket holes on each side of the film 14 (see FIG. 21). Therefore, since photographic data can be imprinted on the film 14 between any two adjacent sprocket holes, there are technically seven areas available for photographic data to be imprinted therein for each film frame FF. However, in the present embodiment, only five different photographic data (Time Value TV, Aperture Value AV, Exposure Compensation Value XV, Exposure Mode and Film (Cartridge) number) are imprinted for each film frame FF (see FIGS. 19 and 21). In each area between two adjacent sprocket holes on the film 14, four characters are imprinted at maximum. Each of the four characters is formed by a matrix of seven dots by five dots. The film 14 moves in the direction from right to left as viewed in FIG. 19 when the film 14 is rewound to be accommodated in the film cartridge FC. Each film switch signal (i.e., the film pulse) shown in FIG. 19 is a low-level/high-level pulse signal which is generated by the film switch 58 when the two output terminals 28a and 28b thereof are electrically connected and disconnected. The level of the film switch signal varies each time an edge of each sprocket hole passes a predetermined position. The CPU 34 (which function as a common detecting device including the function of a sprocket-hole detecting device and the function of the above-mentioned film speed detecting device) detects which edge of the sprocket holes of the film 14 has passed the predetermined position by detecting the variation of the level of the film switch signal to thereby detect the positions of consecutive sprocket holes. The data imprinting device starts imprinting photographic data from a position determined in accordance with the positions of the sprocket holes. In FIG. 19, each reference letter "A" represents the duration of the high level of a film pulse, each reference letter "B" represents the duration of the low level, and each reference numeral "E" represents the time necessary for photographic data to be imprinted between two adjacent sprocket holes. In the data imprinting operation, in order to control the data imprinting device to start imprinting photographic data after a predetermined period of time elapses from the moment of detection that the level of the film pulse varies from low to high, a first delay time "C" necessary for converting four characters which are to be imprinted between two adjacent sprocket holes of the film 14 into photographic data and also a second delay time "D" which is calculated in accordance with the speed of movement of the film 14, are utilized. With these first and second delay times the position of commencement of data-imprinting between two adjacent sprocket holes can be controlled.

Figure 21A:
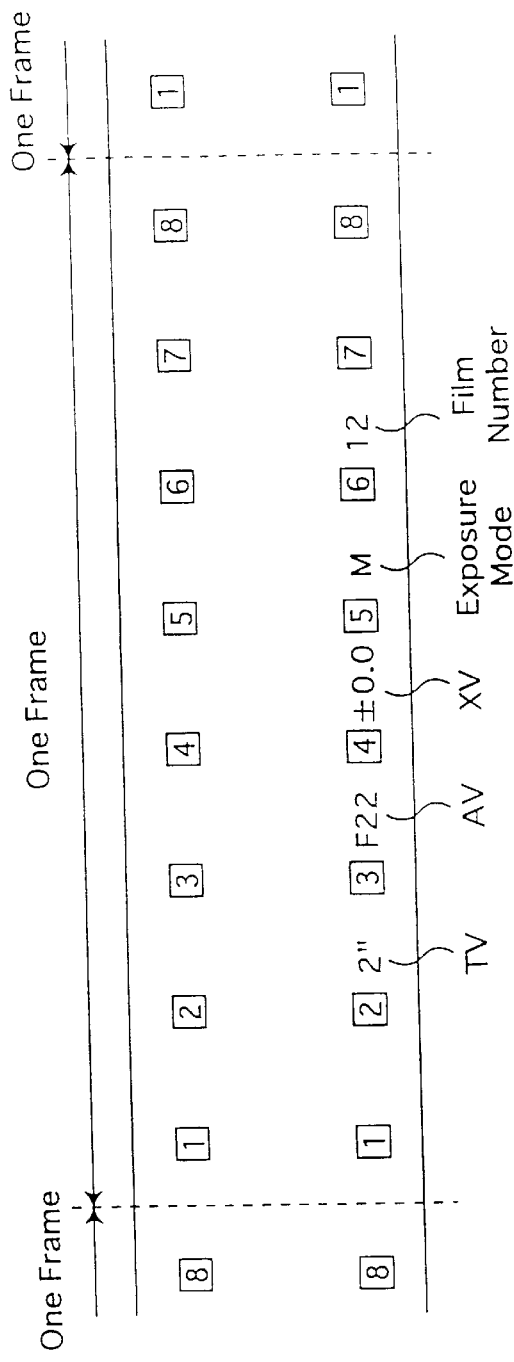
FIGS. 21A and 21B are plan view of part of a roll film on which photographic data are imprinted by the data imprinting device of the camera to which the present invention is applied.
Figure 21B:
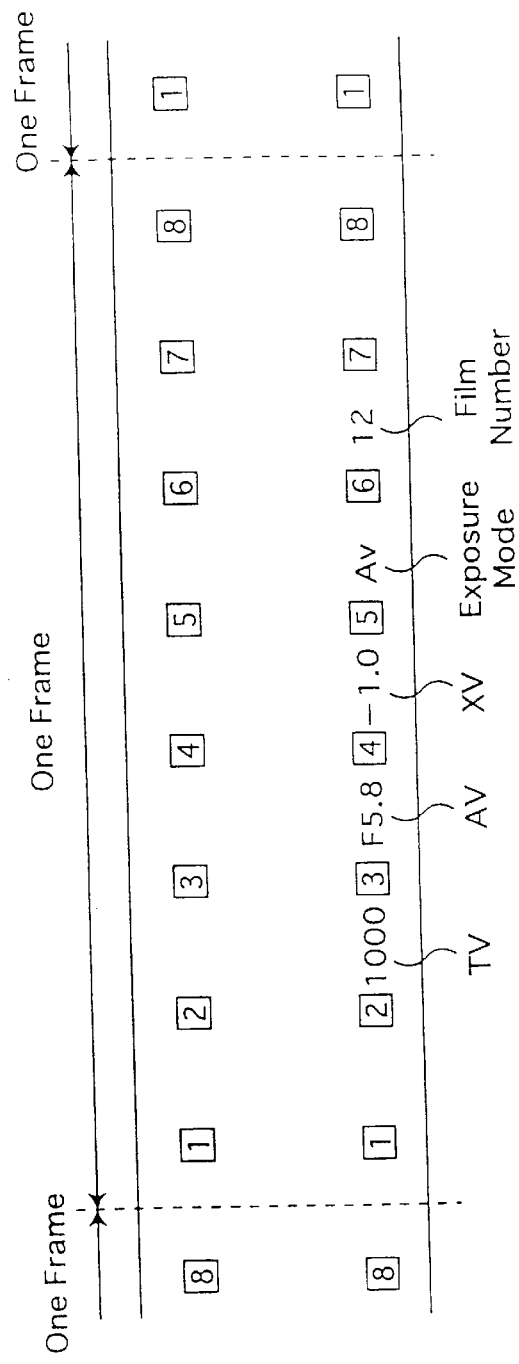

FIG. 20 is an enlarged view of part of the time chart shown in FIG. 19. The data imprinting operation includes an imprinting function wherein, in order to imprint each character formed by a matrix of seven dots by five dots (the matrix constituting one unit of data), the five columns of the matrix (each of which is formed by seven dots), are intermittently imprinted column by column on the film 14 between two adjacent sprocket holes thereof by controlling the character generator 11 to emit light for each column by a data imprinting time (light-emission duration) "G" determined in accordance with the ISO speed information of the film 14 per cycle (data imprinting period) "F" of the pulse signals determined by calculation in accordance with the detected speed of movement of the film 14. The width of each space between two adjacent imprinting characters among the four characters of photographic data is predetermined to correspond to one dot, i.e., one column. Since the data imprinting operation is carried out in such a manner using the cycle "F" of the pulse signals determined by calculation in accordance with the detected speed of movement of the film 14, the width of each character pattern exposed on film is maintained constant. FIGS. 21A and 21B show part of the film 14 on which different photographic data (Time Value TV, Aperture Value AV, Exposure Compensation Value XV, Exposure Mode and Film number) are imprinted for each film frame by the data imprinting device of the present embodiment of the camera.

FIG. 5 is a block diagram of a control circuit of the present embodiment of the SLR camera. The control circuit is provided with the CPU 34 including ROMs and RAMs therein. The control circuit is further provided with a DC/DC converter 35, a voltage regulator 36, a motor driver IC 38, a mirror drive motor 39, a motor driver IC 40, a film winding/rewinding motor 41, a shutter control circuit 42, a diaphragm control circuit 43, a clock generator 44, a clock IC 45, a photometer IC 46, an AVVR (Aperture Value Variable Resistor) 47, a viewfinder internal LCD 48, an LED 49, an external LCD 50, an EEPROM (non-volatile memory) 51, a data imprinting circuit 52, a DX code identifying circuit 53, and various switches which are all connected to the CPU 34. The film take-up spool 24, the rewind shaft 22, the CPu 34, the motor driver IC 40 and the film motor 41 constitute a motorized film transport device. Note that since the present embodiment of the camera is an SLR camera, the camera is provided in the camera body 21 with a quick-return mirror (not shown) which reflects light passed through the photographic optical system (interchangeable lens) towards the finder optical system immediately before a shutter release. A battery 37 as power supply, which is accommodated in a battery chamber of the camera, is connected to the CPU 34 via the DC/DC converter 35 and the voltage regulator 36. The mirror drive motor 39 and the film winding/rewinding motor 41 which function as drive devices are connected to the CPU 34 via the motor drivers IC 38 and 40, respectively. The shutter control circuit 42, the diaphragm control circuit 43, the data imprinting circuit 52 and the DX code identifying circuit 53 which function as circuit devices are connected to the CPU 34. The data imprinting circuit 52 controls the operation of imprinting photographic data between two adjacent sprocket holes of the film 14. The DX code identifying circuit 53 identifies a DX code printed on the film cartridge FC via the DX-information pins 26. The photometer IC 46 and the AVVR 47 which function as sensor devices are connected to the CPU 34. The photometer IC 46 is used for the automatic exposure control of the camera while the AVVR 47 is used to detect the size of the diaphragm. The viewfinder internal LCD 48 indicates various photographic information in the field of view of the viewfinder. The LED 49 illuminates the LCD 48. The external LCD 50 indicates various photographic information such as the selected photographic mode and film information (the number o)f remaining frames, ISO speed information, etc.) at an appropriate position on the camera body 21.

A main switch 61 functions as the power switch for the camera. A photometering switch SWS which is turned ON upon the release button of the camera being half depressed, a release switch SWR which is turned ON upon the release button of the camera being fully depressed, the aforementioned film switch 58 for generating film pulses by movement of the film 14, and a data-imprinting permission switch 54 which turns the emission of the character generator 11 ON and OFF are connected to the CPU 34. Furthermore, a back-lid switch 60 for detecting whether the back lid 13 is open or closed, a mirror-up switch 56 for detecting whether the quick-return mirror is positioned at the upper end position (raised position) thereof, a mirror-down switch 55 for detecting whether the quick-return mirror is positioned at the lower end position (initial position) thereof, a mid-roll rewind switch 59, a film cartridge switch 57 for detecting whether the film cartridge FC in is the film chamber 32, are also connected to the CPU 34. The EEPROM (memory) 51 stores various photographic data and parameters. The clock generator 44 generates drive clock pulses for the CPU 34. The clock IC 45 counts the time and date.

The present embodiment of the camera operates according to a control program in the following manner. Firstly, each time the shutter is released, photographic data (Time Value TV, Aperture Value AV, Exposure Compensation Value XV, Exposure Mode and Film number) on each frame are written into the EEPROM 51 immediately before the shutter is released. After all the frames are exposed, the number of edges of the film pulses generated by the last inch of the film 14 which extends from the trailing edge of the last frame to the film end is written into the EEPROM 51. In this particular embodiment, the film take-up spool 24 locks up when the film end reaches the sprocket 25, i.e., when the sprocket hole at the film end is engaged with any one of the four projections 30 of the sprocket 25. Accordingly, the end of the film 14 is defined by the position of the sprocket 25 provided in the camera body 21 in the present embodiment. Upon commencement of rewinding the film 14, the CPU 34 starts counting the edges of the film pulses to detect the trailing edge of the last frame in accordance with the number of edges of the film pulses written into the EEPROM 51. Specifically, the sprocket 25, the projections 30, the gear 31, the detector board 28, the brush 29, and the CPU 34 constitute a frame edge detector. The CPU 34 controls the data imprinting device so that it does not imprint any photographic data on film in the last inch of the film 14 which extends from the trailing edge of the last frame to the film end. Namely, after the rewinding operation starts, the CPU 34 starts counting the edges of the film pulses and frames upon detecting the trailing edge of the last frame to start imprinting corresponding photographic data on respective exposed frames precisely at predetermined areas thereof.

Figure 6A:
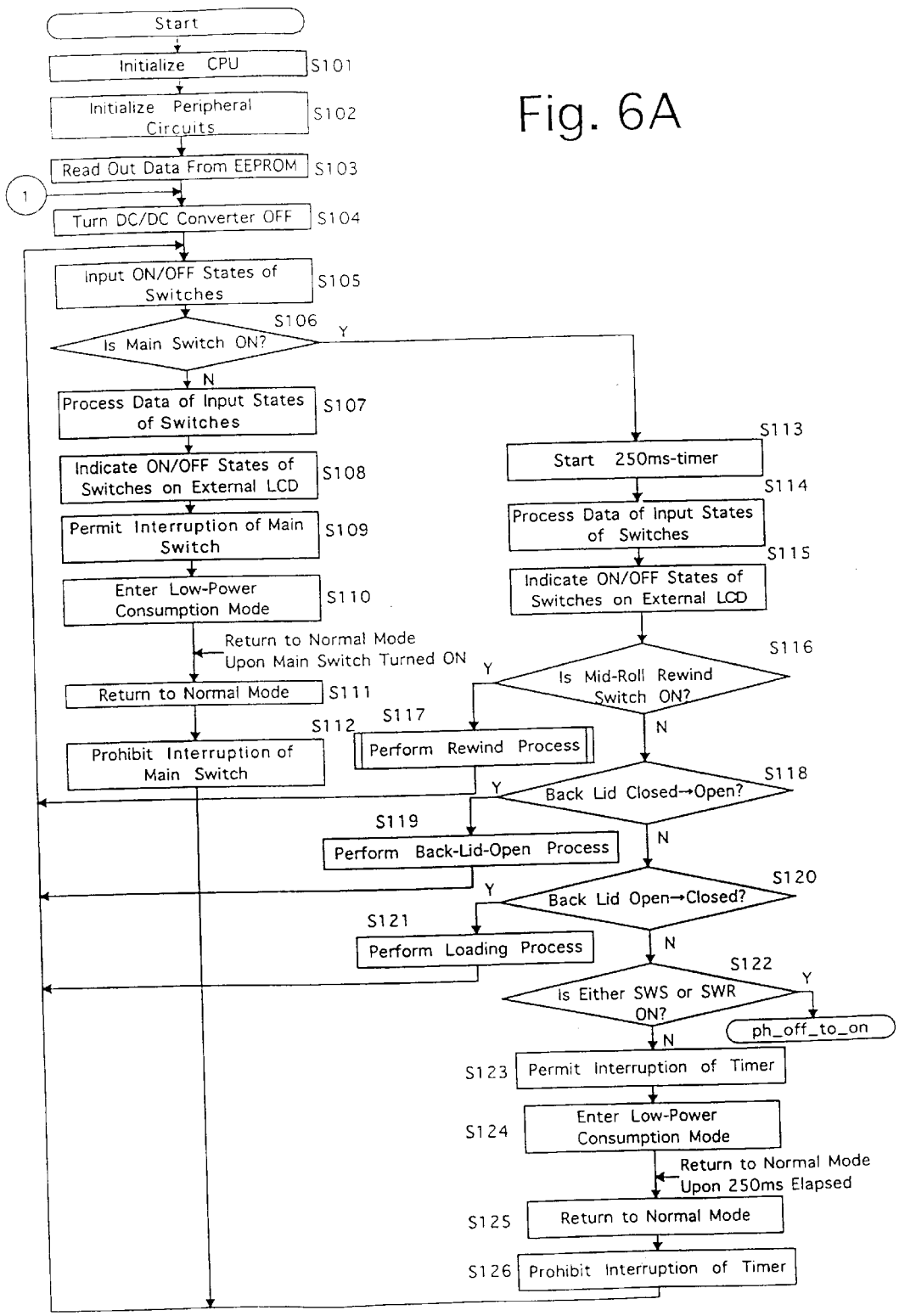
FIG. 6A is a part of flow chart of the main routine of the camera shown in FIG. 1.
Figure 6:
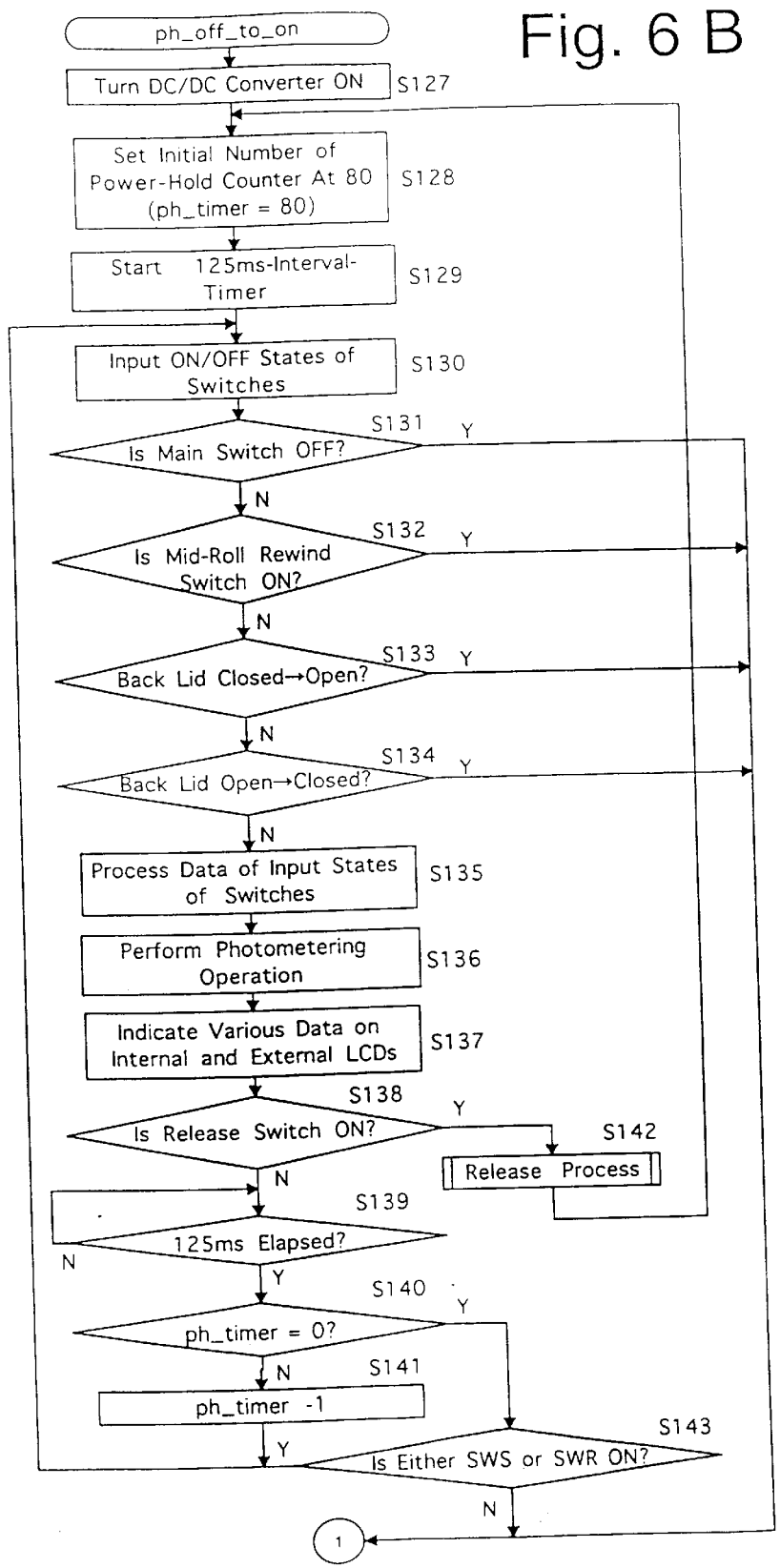
FIG. 6B is a part of flow chart of the main routine of the camera shown in FIG. 1.

Control of the camera of the present embodiment will be hereinafter discussed with reference to FIGS. 6A and 6B, which shows a flow chart of the main routine of the camera. The CPU 34 performs all the operations and processes contained in the main routine shown in FIG. 6A. Control enters the main routine immediately after the battery 37 is loaded is in the camera. At first, the CPU 34 and peripheral circuits are initialized (steps S101 and S102). Subsequently, data stored in the EEPROM 51 is read out to be input to the internal RAM of the CPU 34 (step S103), and the DC/DC converter 35 is turned OFF (step S104) Thereafter, the ON/OFF states of all the switches are input to the CPU 34 (step S105). Subsequently, it is determined whether the main switch 61 is ON (step S106). If it is determined that the main switch 61 is not ON, data of the ON/OFF states of all the switches is processed to be indicated on the external LCD panel 50 (steps S107 and S108). Subsequently, interruption of the main switch 61 is permitted (step S109), and the camera falls into a low-power consumption mode, i.e., a sleep mode (step S110). The camera returns to a normal mode immediately after the main switch 61 is turned ON (step S111). Thereafter, an interruption of the main switch 61 is prohibited (step S112), control returns to step S105, and the operations from step S105 to step S112 are repeated.

If it is determined at step S106 that the main switch 61 is ON, a 250 ms timer in the CPU 34 starts, in preparation for the photographing process (step S113). Subsequently, data of the ON/OFF states of all the switches which are input to the CPU 34 at step S105 is processed to be indicated on the external LCD panel 50 (steps S114 and S115). Subsequently, it is determined whether the mid-roll rewind switch 59 is ON (step S116). If it is determined that the mid-roll rewind switch 59 is ON, this indicates that the mid-roll rewind switch 59 has been depressed, so that the rewind process is performed (step S117). After the rewind process is completed, control returns to step S105. In the rewind process, the data imprinting device operates to imprint photographic data on the film 14 The details of the rewind process will be discussed later. If it is determined at step S116 that the mid-roll rewind switch 59 is OFF, it is determined whether the state of the back lid 13 has changed from a closed state to an open state (step S118). If it is determined that the state of the back lid 13 has changed from a closed state to an open state, the back-lid-open process is performed (step S119) and subsequently control returns to step S105. If it is determined at step S118 that the state of the back lid 13 has not changed from a closed state to an open state, it is determined whether the state of the back lid 13 has changed from an open state to a closed state (step S120). If it is determined that the state of the back lid 13 has changed from an open state to a closed state, indicating that the film cartridge FC may have been loaded into the camera, the loading process is performed (step S121) and subsequently control returns to step S105. If the back lid 13 remains closed, it is determined whether either the photometering switch SWS or the release switch SWR is ON, i.e., whether the release button is in the state of being half or fully depressed (step S122). If neither switch SWS nor SWR is ON, interruption of the timer is permitted (step S123), and the camera falls into the low-power consumption mode, i.e., the sleep mode (step S124). Thereafter, the camera returns to the normal mode immediately after the 250 ms timer elapses (step S124). Thereafter, interruption of the timer is prohibited (step S126), and control returns to step S105.

If it is determined at step S122 that either the photometering switch SWS or the release switch SWR is ON, i.e., the release button is in the state of being at least half depressed, the DC/DC converter 35 is turned ON in preparation for the release process of step S142 (step S127). Subsequently, the initial number of a power-hold counter in the CPU 34 is set to 80 (step S128), and a 125 ms interval timer in the CPU 34 starts (step S129). Namely, after the photometering switch SWS is turned ON, a power-holding time for holding the camera in the normal mode is set to 10 seconds (=80×125 (ms)) so that the camera does not fall into the sleep mode until the power-holding time elapses Thereafter, the ON/OFF states of all the switches are input to the CPU 34 (step S130). Subsequently, it is determined whether the main switch 61 is OFF (step S131). If it is determined at step S131 that the main switch 61 is OFF, it is no longer necessary for the camera to be held in the normal mode, therefore control returns to step S104. If it is determined at step S131 that the main switch 61 is not OFF, it is determined whether the mid-roll rewind switch 59 is ON (step S132). If it is determined that the mid-roll rewind switch 59 is ON, control returns to step S104 in order to perform the rewind operation at step S117. If it is determined at step S132 that the mid roll rewind switch 59 is not ON, it is determined whether the state of the back lid 13 has changed from a closed state to an open state (step S133). If it is determined that the state of the back lid 13 has changed from a closed state to an open state, control returns to step S104 to perform the back-lid-open process at step S119. If it is determined at step S133 that the state of the back lid 13 has not changed from a closed state to an open state, it is determined whether the state of the back lid 13 has changed from an open state to a closed state (step S134). If it is determined at step S134 that the state of the back lid 13 has changed from an open state to a closed state, control returns to step S104 to perform the loading process at step S121. If the back lid 13 remains closed, data which varies due to the variation of the ON/OFF state of each switch is renewed (step S135). Subsequently, the photometering operation is performed (step S136), and the indicating process for indicating various photographic data on each of the internal and external LCDs 48 and 50 is performed (step S137).

Subsequently, it is determined whether the release switch SWR is ON (step S138), and the release process is performed (step S142) if the release switch SWR is ON. If it is determined at step S138 that the release switch SWR is not ON, it is determined whether the 125 ms of the 125 ms interval timer has elapsed (step S139). The operation at step S139 is repeated until the 125 ms elapses. Immediately after the 125 ms has elapsed, it is determined whether the value of the power-hold timer is zero (step S140). If the value of the power-hold timer is not zero, the number is decreased by one (step S141), and control returns to step S130 so that the operations from step S130 to step S141 are repeated until the value of the power-hold timer is zero. If it is determined at step S140 that the value of the power-hold timer is zero, it is determined whether either the photometering switch SWS or the release switch SWR is ON (step S143). If either switch SWS or SWR is ON, indicating that the release button is still in the state of being at least half depressed, control returns to step S130 in preparation for the release process of step S142. If neither switch SWS nor SWR is ON, control returns to step S104.

The release process performed at step S142 will be hereinafter discussed with reference to FIG. 7 which shows a flow chart thereof. As shown in the release process flow chart, the exposure process, in which the diaphragm and the quick-return mirror are actuated, is performed immediately after the release switch is fully depressed. In the release process, firstly the final photometering process and the indicating process are performed before the shutter is released (step S201). Subsequently, photographic data (Time Value TV, Aperture Value AV, Exposure Compensation Value XV and Exposure Mode) are stored in respective addresses for the current Film number in the EEPROM 51 (step S202). Subsequently, the mirror-up process, the diaphragm stop-down process, the exposure process (shutter control process), the mirror-down process and the shutter-mechanism charging process are performed (steps S203, S204 and S205). Thereafter, the film winding process is performed (step S206). Subsequently, it is determined whether the film end is detected (step S207). If the film end is detected, the rewind process is performed (step S208) and control returns, otherwise the rewind process is not performed and control returns.

Figure 7:
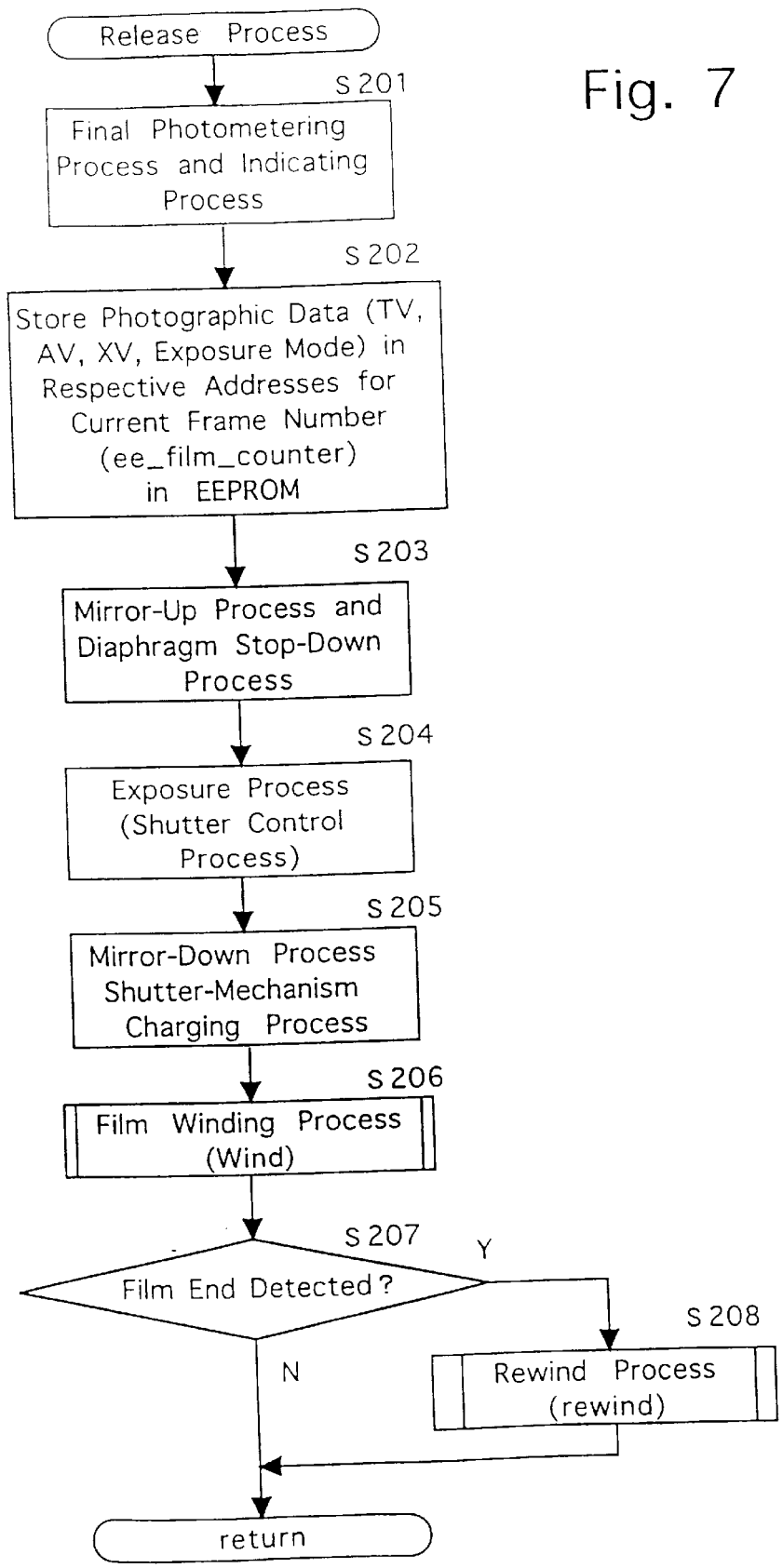
FIG. 7 is a flow chart of the release process of the camera shown in FIG. 1.
Figure 8:
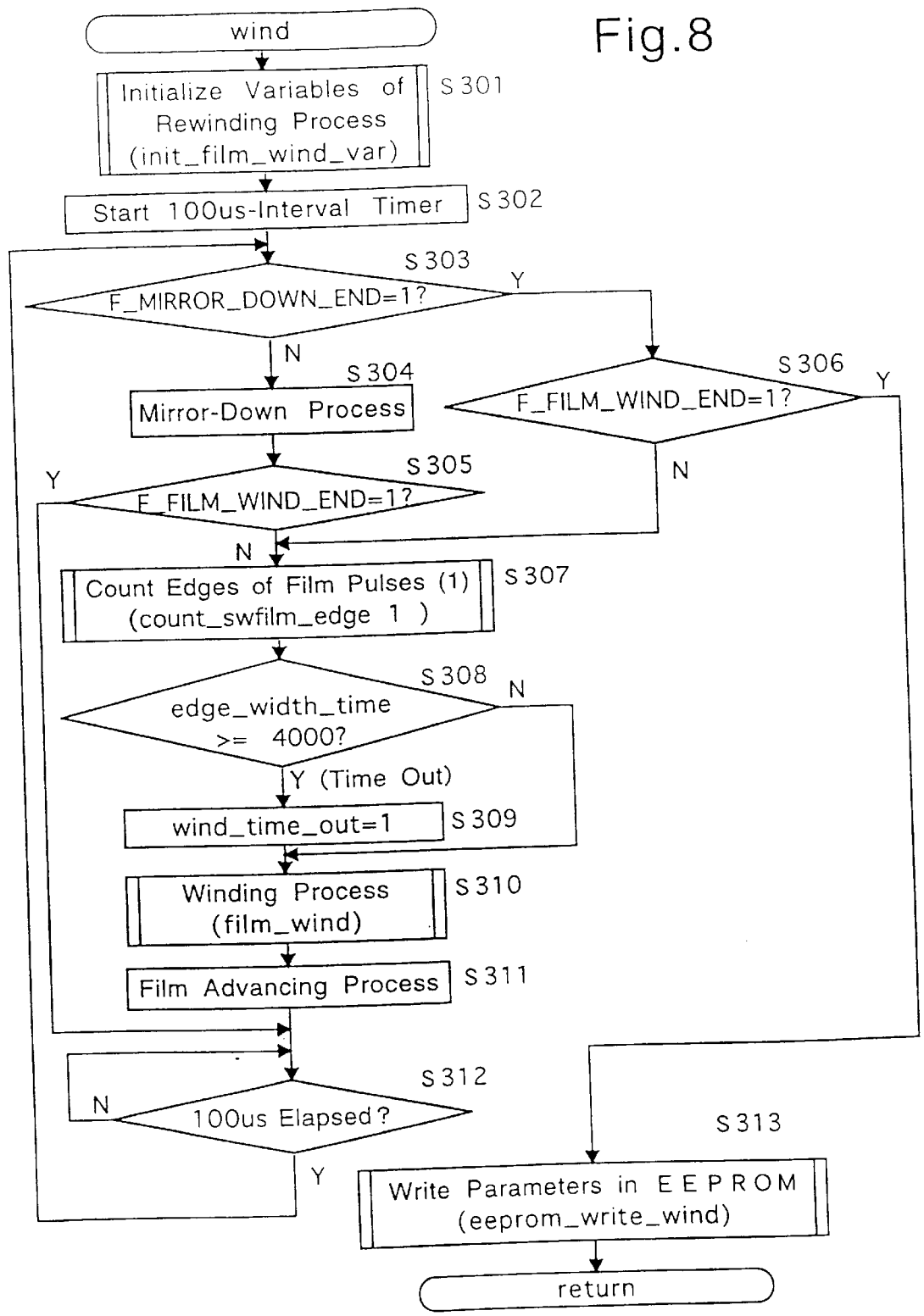
FIG. 8 is a flow chart of a sub-routine in which parameters are written in an EEPROM immediately after the winding operation, of the flow chart shown in FIG. 7, to move the film on one frame is completed.
Figure 9:
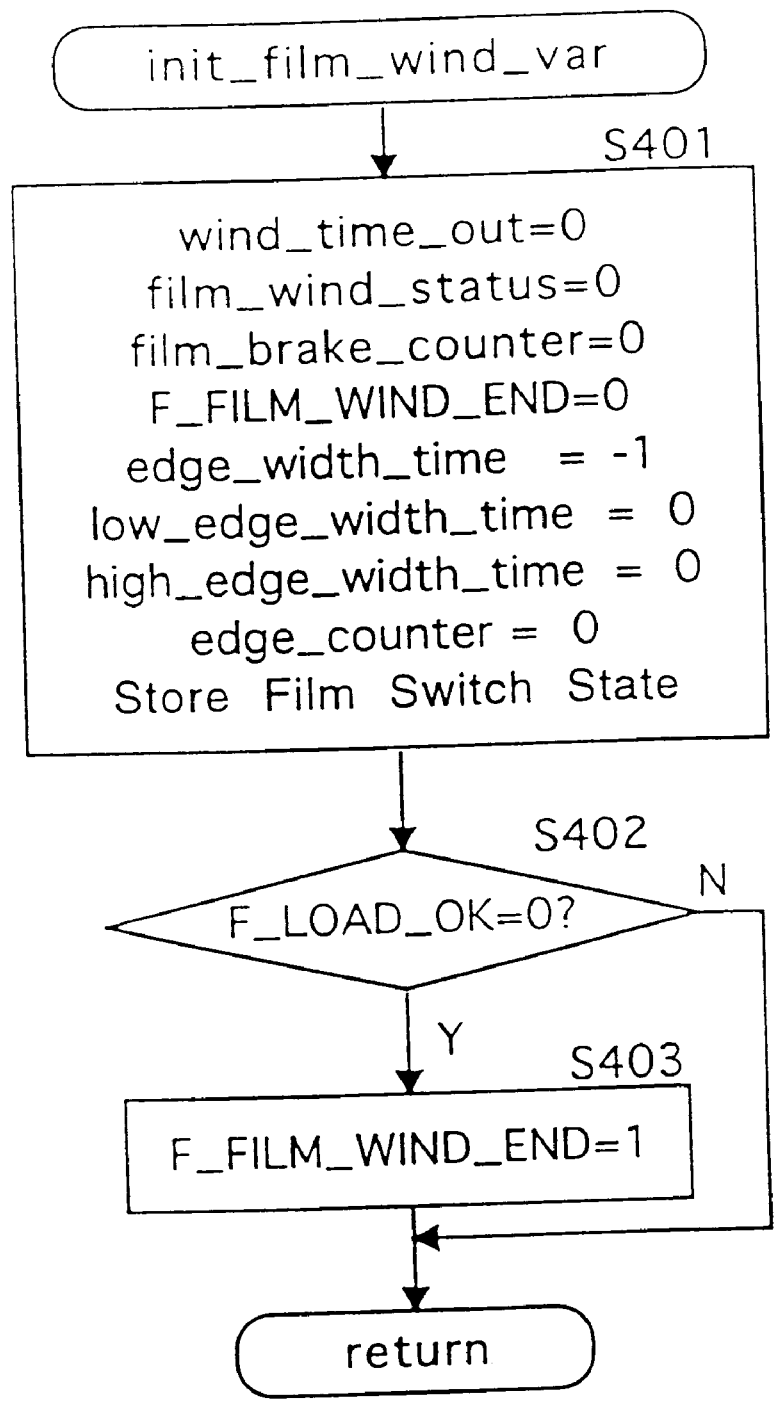
FIG. 9 is a flow chart of a sub-routine of the flow chart shown in FIG. 8.

FIG. 8 shows a flow chart of the process at step S206 shown in FIG. 7. In this process, firstly all the variables used in the rewinding process are initialized (step S301). In the process at step S301, as shown in the flow chart in FIG. 9, variables "wind_time_out", "film_wind_status", "film_brake_counter", "F_FILM_WIND_END", "low_edge_width_time", "high_edge_width_time" and "edge_counter" are all set to 0, and variable "edge_width_time" is set to −1, and the state of the film switch 58 is stored in the internal RAM of the CPU 34 (step S401). Subsequently, it is determined whether a loading-completion flag (F_LOAD_OK) is 0 (step S402). If the loading-completion flag (F_LOAD_OK) is not 0, indicating that the film cartridge FC has been loaded in the camera, control returns. If it is determined at step S402 that the loading-completion flag (F_LOAD_OK) is 0, indicating that a film cartridge FC is not loaded in the camera, the film-winding completion flag (F_FILM_WIND END) is set to 1 (step S403) and control returns because it is not necessary to rewind the film 14.

After the operation at step S301, a 100 $\mu$s-interval timer in the CPU 34 starts (step S302). Subsequently, it is determined whether the micror-down process has completed (i.e., whether the flag (F_MIRROR_DOWN_END) is 1) (step S303). If it is determined that the mirror-down process has not yet completed (i.e., the flag (F_MIRROR_DOWN_END) is not 1), the mirror-down process is performed (step S304) and subsequently it is determined whether the flag (F_FILM_WIND_END) is 1 (step S305). If the flag (F_FILM_WIND_END) is 1, it is determined whether 100 $\mu$s has elapsed (step 5312). Step S312 is repeated until 100 $\mu$s has elapsed thereat. If it is determined at step S312 that 100 $\mu$s has elapsed, control returns to step S303. The 100 $\mu$s-interval timer defines the period of repeating the operations from step S303 to step S312.

If it is determined at step S303 that the mirror down process has completed (i.e., the flag (F_MIRROR_DOWN_END) is 1), it is determined whether the film-winding completion flag (F_FILM_WIND_END) is 1 (step S306). If the film-winding completion flag (F_FILM_WIND_END) is 1, parameters at this moment (the details of these parameters will be discussed hereinafter) are written into the EEPROM 51 (step S313) and control returns. If the film-winding completion flag (F_FILM_WIND_END) is riot 1, the leading and trailing edges (designated by the reference numerals 1 through 16 for each frame as shown in FIG. 19) of the film pulses generated by the variation in the state of the film switch are counted (step S307). The details of the process at step S307 will be discussed later. Subsequently, it is determined whether the number of an edge-width measuring counter (edge_width_time) in the CPU 34 that is used for measuring a half of the period of the film pulse is equal to or over 4,000, i.e., whether 400 ms has elapsed since the aforementioned 100 μs-interval timer started (step S308). Namely, since the number of the edge-width measuring counter (edge_width_time) increases by one each time 100 μs elapses as long as the state of the film pulse does not vary from the previous state thereof, the number "4,000" of the edge-width measuring counter (edge_width_time) corresponds to a lapse of 400 ms. Therefore, it is determined at step S308 whether 400 ms has elapsed since the aforementioned 100 μs-interval timer started. If it is determined at step 5308 that the number of the edge-width measuring counter (edge_width_time) is equal to or over 4,000, indicating that the film 14 is not in motion, the CPU 34 judges that the film 14 has reached the end, upon winding thereof (i.e., the film end has reached the sprocket 25), and thus the wind-time-out flag (wind_time_out) which indicates the time-out on film wending is set to 1 (step S309). Subsequently the film winding process is performed (step S310).

If it is determined at step S308 that the number of the edge-width measuring counter (edge_width_time) is less than 4,000, the operation at step S309 is skipped and subsequently the film winding process is performed (step S310). Subsequently, a character or characters showing the number of film frame and/or a character having the shape of a film cartridge FC are indicated on the external LCD 50 to inform the user that the film 14 is now being wound (step S311). Subsequently, it is determined whether 100 μs has elapsed (step S312). The operation at step S312 is repeated until 100 μs has elapsed thereat. If it is determined at step S312 that 100 μs has elapsed, control returns to step S303, so that the operations from step S303 to step S312 are repeated.

Figure 10:
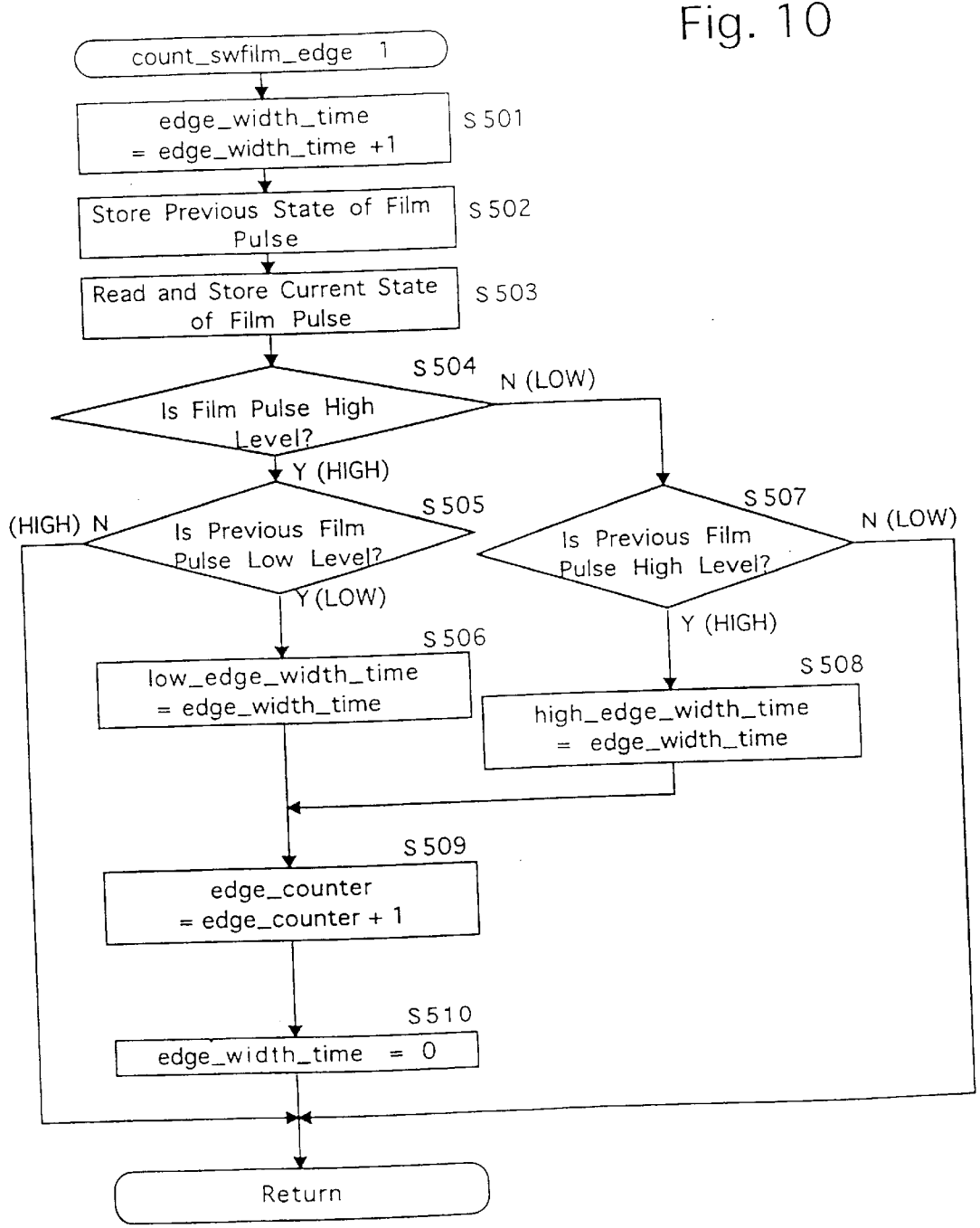
FIG. 10 is a flow chart of a sub-routine of the flow chart shown in FIG. 8.

The process at step S307 in which the leading and trailing edges of the film pulses generated by the variation in the state of the film switch 58 are counted will be hereinafter discussed with reference to FIG. 10. In this process, the state of the film pulse (i.e, whether the level of the film pulse is low or high) is detected every 100 μs to measure the numerical value shown by the pulse-width measuring counter (edge_width_time), i.e., the period of time from the moment the state of the film pulse changes to the subsequent moment the state of the film pulse changes. In this process, firstly, the pulse-width measuring counter (edge_width_time) is increased by one (step S501). Subsequently the previous state (low level or high level) of the film pulse is stored (e.g., in a register), and the current state of the film pulse is read out to be stored (e.g., in a register) (steps S502 and S503). Subsequently, it is determined whether the level of the current film pulse is high (step S504). If it is detected at step S504 that the level of the current film pulse is high, it is determined whether the level of the previous film pulse is low (step S505). If it is detected at step S505 that the level of the previous film pulse is not low, indicating that the level of the film pulse remains to be high, control returns. If it is detected at step S505 that the level of the previous film pulse is low, indicating that the leading edge of film pulse has been detected, the value of the pulse-width measuring counter (edge_width_time) at this moment is stored as a low-pulse width or low-pulse duration (low_edge_width_time) (step S506). Namely, a period of time corresponding to the low-pulse width (low_edge_width_time) corresponds a period of time of the low-level film pulse. After the operation at step S506 or S508, an edge counter (edge_counter) for counting the leading and trailing edges of the film pulses in the direction of winding the film 14 is increased by 1 (step S509) Subsequently, the pulse-width measuring counter (edge_width_time) is set to 0 (step S510) and control returns. If it is detected at step S504 that the level of the current film pulse is not high, it is determined whether the level of the previous film pulse is high (step S507). If the level of the previous film pulse is not high, indicating that the level of the film pulse remains low, control returns. If the level of the previous film pulse is high, indicating that the trailing edge of film pulse has been detected, the pulse width measuring counter (edge_width_time) at this moment is stored as a high-pulse width or high-pulse duration (high_edge_width time) (step S508) and subsequently control proceeds to the operation at step SS09.

Figure 11:
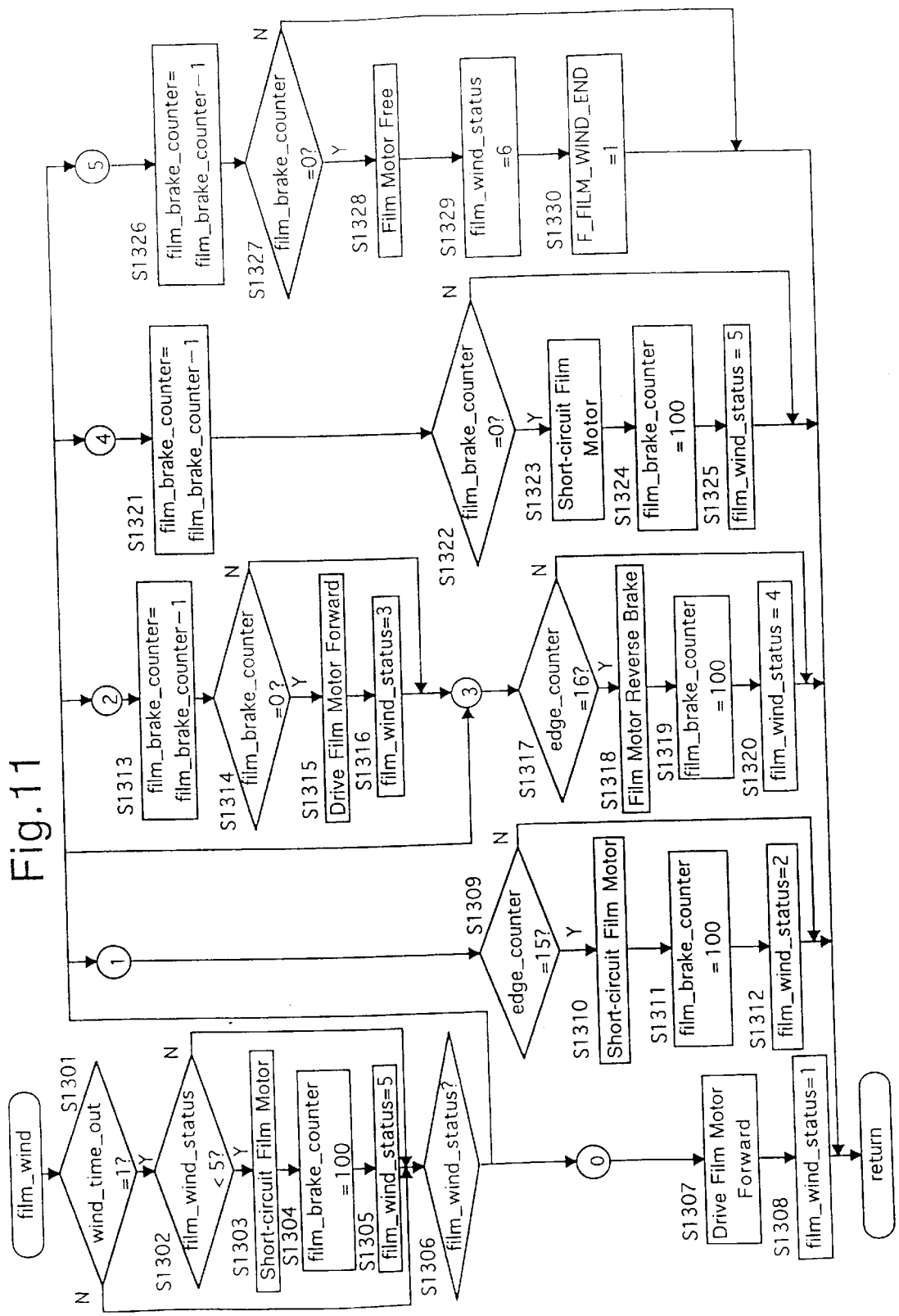
FIG. 11 is a flow chart of a sub routine of the flow chart shown in FIG. 8.

The film winding process at step S310 will be hereinafter discussed with reference to FIG. 11. The sub-routine shown in FIG. 11 controls the film winding/rewinding motor 41 from the commencement time to the completion time of winding the film 14. In this process, it is determined whether the wind-time-out flag (wind_time_out) is 1, i.e., whether the winding of the film 14 has reached the film end (step S1301) If the wind-time-out flag (wind_time_out) is 1, indicating that the winding of the film 14 has reached the film end, it is necessary to stop the film winding/rewinding motor 41. Therefore, it is determined whether the film-wind-control-status counter (film_wind_status) is less than 5 (step S1302). The film-wind-control-status counter (film_wind_status) represents the step in control of the winding process and indicates that the film winding/rewinding motor 41 is still in operation if the number of the counter is less than 5. If it is detected at step S1302 that the film wind-control-status counter (film_wind_status) is less than 5, the film winding/rewinding motor 41 is braked via short-circuiting, the film brake counter (film_brake_counter) is set to 100 (=10 ms since it takes 100 μs for a single loop of the winding process), and the film-wind-control-status counter (film_wind_status) is set to 5 (steps S1303, S1304 and S1305). If it is determined at step S1301 that the wind-time-out flag (wind_time_out) is not 1 or if it is determined at step S1302 that the film-wind-control-status counter (film_wind_status) is not less than 5, the film-wind-control-status counter (film_wind_status) is checked (step S1306). If the film-wind-control-status counter (film_wind_status) is 0, the film winding/rewinding motor 41 is driven forward to wind the film 14 (step S1307) and subsequently the film-wind-control-status counter (film_wind_status) is set to 1 (step S1308). Subsequently control returns.

If the film-wind-control-status counter (film_wind_status) is 1, it is determined whether the edge counter (edge_counter) is 15 (step S1309). Control returns if the counter (edge_counter) is not 15, so that the operations from step S303 to S312 are repeated until the edge counter (edge counter) reaches 15. If it is determined at step S1309 that the edge counter (edge_counter) is 15, indicating that the film winding by one frame is almost completed, the film winding/rewinding motor 41 is braked via short-circuiting, the film brake counter (film_brake_counter) is set to 100, and the film-wind-control-status counter (film_wind_status) is set to 2 (steps S1310, S1311 and S1312). Subsequently, control returns.

If the film-wind-control-status counter (film_wind_status) is 2, the film brake counter (film_brake_counter) is decreased by one (step S1313), and subsequently it is determined whether the film brake counter (film_brake_counter) is 0 (step S1314). If the film brake counter (film_brake_counter) is not 0 (Step S1314), control proceeds to step S1317. If it is determined at step S1314 that the film brake counter (film_brake_counter) is 0, the film winding/rewinding motor 41 is driven forward to wind the film 14 (step S1315) and subsequently the film-wind-control-status counter (film_wind_status) is set to 3 (step S1316). Subsequently control proceeds to the operation at step S1317.

If it is determined at step S1306 that the film-wind-control-status counter (film_wind_status) is 3, it is determined whether the edge counter (edge_counter) is 16 (step S1317). Control returns if the counter (edge_counter) is not 16, so that the operations from step S303 to S312 are repeated until the edge counter (edge_counter) reaches 16. If it is determined at step S1317 that the edge counter (edge_counter) is 16, so that the film winding/rewinding motor 41 is braked by reversing the driving direction thereof, the film brake counter (film_brake_counter) is set to 100, and the film-wind-control-status counter (film_wind_status) is set to 4 (steps S1318, S1319 and S1320). Subsequently, control returns.

If the film-wind-control-status counter (film_wind_status) is 4, the film brake counter (film_brake_counter) is decreased by one (step S1321), and subsequently it is determined whether the film brake counter (film_brake_counter) is 0 (step S1322). Control returns if the film brake counter (film brake_counter) is not 0, so that the operations from step S303 to S312 are repeated until the film brake counter (film_brake_counter) becomes 0. If it is determined at step S1322 that the film brake counter (film_brake_counter) is 0, the film winding/rewinding motor 41 is braked via short-circuiting, the film brake counter (film_brake_counter) is set to 100, and the film-wind-control-status counter (film_wind_status) is set to 5 (steps S1323, S1324 and S1325). Subsequently, control returns.

If the film-wind-control status counter (film_wind_status) is 5, the film brake counter (film_brake_counter) is decreased by one (step S1326), and subsequently it is determined whether the film brake counter (film_brake_counter) is 0 (step S1327). Control returns if the film brake counter (film_brake_counter) is not 0, so that the operations from step S303 to S312 are repeated until the film brake counter (film_brake_counter) becomes 0. If it is determined at step S1327 that the film brake counter (film_brake_counter) is 0, the film winding/rewinding motor 41 is freed, and the film-wind-control-status counter (film wind_status) is set to 6, and the film-winding completion flag (F_FILM_WIND_END) is set to 1 (steps S1328, S1329 and S1330). Subsequently control returns.

Figure 12:
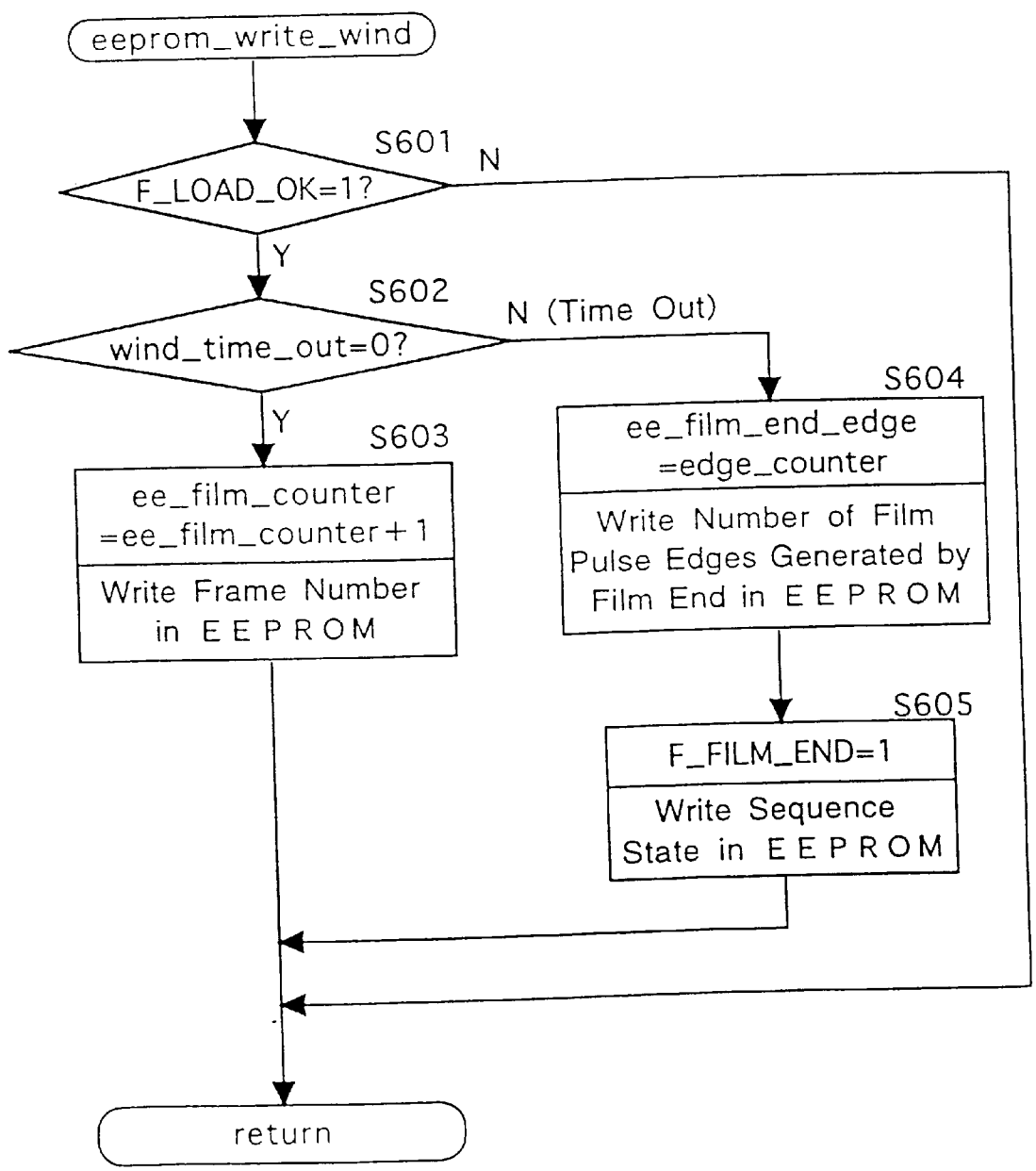
FIG. 12 is a flow chart of a sub-routine of the flow chart shown in FIG. 8.

The process at step S313 will be hereinafter discussed with reference to FIG. 12. In this process, it is determined whether the loading-completion flag (F_LOAD_OK) is 1, i.e., whether the film has been loaded (step S601). If the loading-completion flag (F_LOAD_OK) is not 1, indicating that a film cartridge is not loaded in the camera, control returns. If the loading-completion flag (F_LOAD_OK) is 1, the film cartridge FC has been loaded in the camera, and it is determined whether the wind-time-out flag (wind_time_out) is 0 (step S602). If the wind-time-out flag (wind_time_out) is 0, indicating that the winding of the film 14 has not yet reached the film end, a film-frame-number counter (ee_film_counter) is increased by one and the number thereof is written into the EEPROM 51 (step S603). If the wind-time-out flag (wind_time_out) is not 0, indicating that the winding of the film 14 has reached the film end, a film-end-edge number (ee_film_end_edge), which indicates the number of edges of the film pulses generated by the last inch of the film 14 from the trailing edge of the last frame to the film end, is written into the EEPROM 51 as the numerical value of the edge counter (edge_counter) at this moment (step S604). When the film 14 is rewound, the trailing edge of the last frame can be detected in accordance with the film-end edge number (ee_film_end_edge) stored in the EEPROM 51. After the operation at step S604, a film end flag (F_FILM_END) is set to 0 and written into in the EEPROM 51 (step S605). Thereafter control returns.

The rewind process performed at steps S117 and S208 will be hereinafter discussed with reference to FIG. 13 which shows a flow chart thereof. In the rewind process, firstly all the variables for the rewind process are initialized while the state of the film switch 58 is stored in the internal RAM of the CPU 34 (step S701). Subsequently, the film winding/rewinding motor 41 is driven to reverse the drive shaft thereof to rewind the film 14 (step S702), and a 100 μs interval timer in the CPU 34 starts (step S703). The 100 μs interval timer defines the period for repeating the operations from step S704 to step S708. Subsequently, the leading and trailing edges (designated by the reference numerals 1 through 16 for each frame as shown in FIG. 19) of the film pulses generated by the movement of the film 14 are counted (step S704). Subsequently, the data imprinting process is performed (step S705), and a character or characters showing the number of film frame and/or a character having the shape of a film cartridge FC are indicated on the external LCD 50 to inform the user that the film 14 is now being rewound (step S706). Subsequently, it is determined whether the total counted number of a pulse-width measuring counter (edge_width_time) in the CPU 34 that is used for measuring a half of the period of the film pulse is over 16,000, i.e., whether 1.6 seconds has elapsed since the aforementioned 100 μs interval timer started (step S707). If it is determined at step S707 that 1.6 seconds has not yet elapsed, it is determined whether 100 μs has elapsed (step S708). The operation at step S708 is repeated until 100 μs has elapsed thereat. If it is determined at step S708 that 100 μs has elapsed, control returns to step S704.

Accordingly, the operations from step S704 to S708 are repeated until it is determined at step S707 that 1.6 seconds has elapsed since the aforementioned 100 μs interval timer started. The number of the pulse-width measuring counter (edge_width_time) increases by one every time 100 μs elapses.

If it is determined at step S707 that 1.6 seconds has elapsed without any variation of the film pulses level, indicating that the film 14 has been completely rewound, the power supply to the film winding/rewinding motor 41 is stopped in order to stop the film winding/rewinding motor 41 (step S709), and the film winding/rewinding motor 41 is freed from control (step S710). Subsequently, it is determined whether a normal-loading completion flag (F_LOAD_OK) is 1 (step S711). If the normal-loading completion flag (F_LOAD_OK) is 1, indicating that the film cartridge FC has been loaded in the camera, a serial number (ee_film_no) which shows the serial number of the film cartridge FC is increased by one and stored the EEPROM 51 (step S712). If it is determined at step S711 that the normal-loading completion flag (F_LOAD_OK) is not 1, control skips the operation at step S712. A film-end-edge counter (ee_film_end_edge), which indicates the number of edges of the film pulses generated within the last inch of the film 14 from the trailing edge of the last frame to the film end, and a film-frame-number counter (ee_film_counter) are each set to 0 and these values are stored in the EEPROM 51 (steps S713 and S714). Subsequently, the normal-loading completion flag (F_LOAD_OK), a film end flag (F_FILM_END) and a rewind end flag (F_REW_END) are set to 0, 0 and 1, respectively, and are stored in the EEPROM 51 (step S715). Thereafter control returns.

Figure 14:
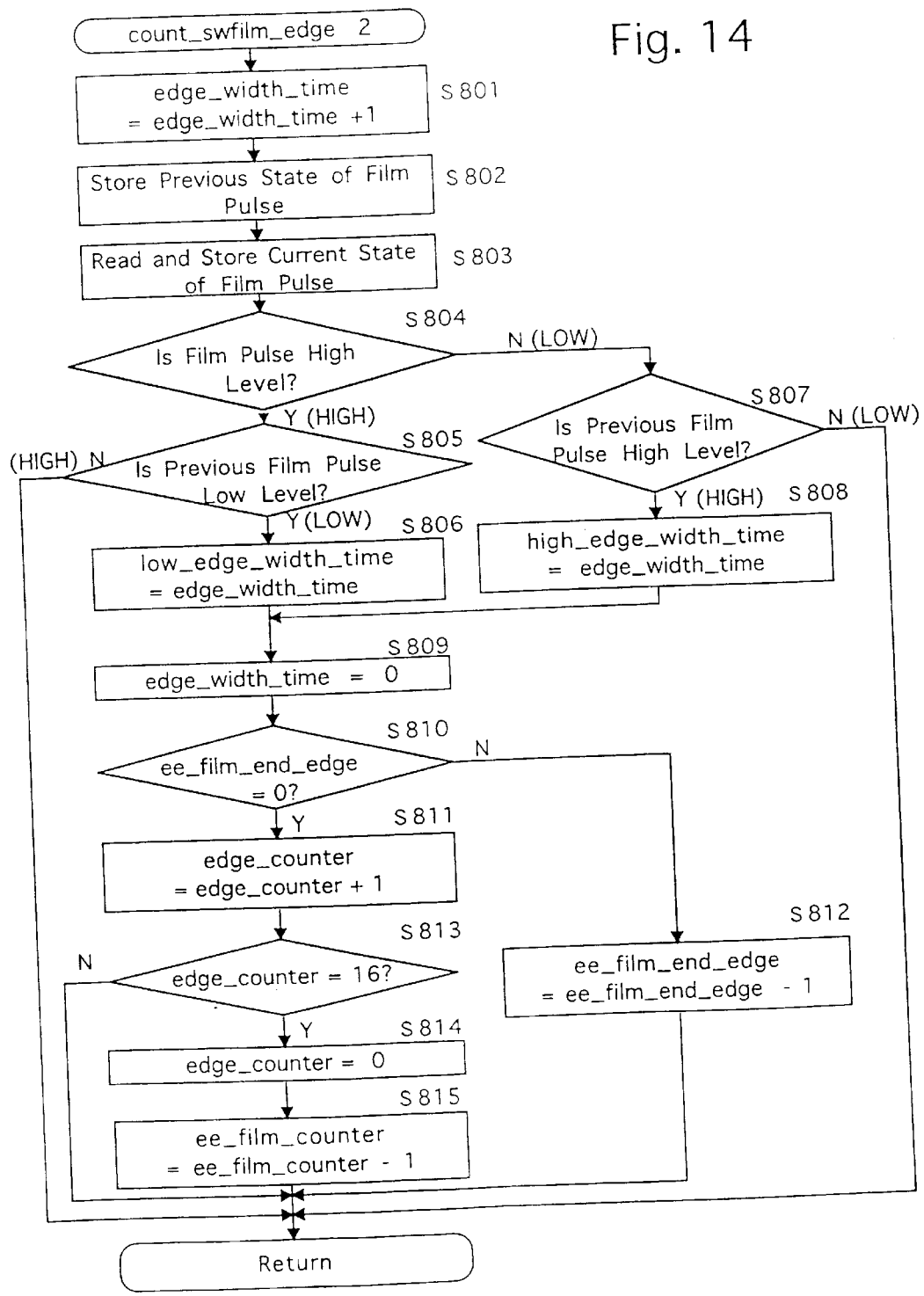
FIG. 14 is a flow chart of a sub-routine of the flow chart shown in FIG. 13.

The process at step S704 in which the leading and trailing edges of the film pulses generated by the movement of the film 14 are counted will be hereinafter discussed with reference to FIG. 14. In this process, the state of the film pulse (i.e., whether the level of the film pulse is low or high) is detected every 100 μs to measure the numerical value shown by the pulse-width measuring counter (edge_width_time), i.e., the period of time from the moment the state of the film pulse changes to the subsequent moment the state of the film pulse changes. In this process, firstly, the pulse-width measuring counter (edge_width_time) is increased by one (step S801). Subsequently the previous state (low level or high level) of the film pulse is stored (e.g., in a register), and the current state of the film pulse is read out to be stored (e.g. in a register) (steps S802 and S803). Subsequently, it is determined whether the level of the current film pulse is high (step S804). If it is detected at step S804 that the level of the current film pulse is high, it is determined whether the level of the previous film pulse is low (step S805). If it is detected at step S805 that the level of the previous film pulse is not low, indicating that the level of the film pulse remains high, so that control returns. If it is detected at step S805 that the level of the previous film pulse is low, indicating that the leading edge of film pulse has been detected, so that the value of the pulse-width measuring counter (edge_width_time) at this moment is stored as a low-pulse width or low pulse duration (low_edge_width_time) (step S806). Namely, a period of time corresponding to the low-pulse width (low_edge_width_time) corresponds a period of time of the low-level film pulse. Subsequently, the pulse-width measuring counter (edge_width_time) is set to 0 in order to measure a half of the period of the subsequent film pulse (step S809). Subsequently, it is determined whether the film-end-edge number (ee_film_end_edge) is 0 (step S810). If it is determined that the film_end_edge number (ee_film_end_edge) is not 0, indicating that the trailing edge of the last frame has not been detected, so that the film-end-edge number (ee_film_end_edge) is decreased by 1 (step S812) for the subsequent edge of the film pulse, and control returns. If it is determined at step S810 that the film-end-edge number (ee_film_end_edge) is 0, indicating that the trailing edge of the last frame has been detected, an edge counter (edge_counter) for counting the leading and trailing edges of the film pulses in the direction of rewinding the film 14 is increased by 1 to start counting the edges of the film pulses from the trailing edge of the last frame. (step S811). Subsequently, it is determined whether the edge counter (edge_counter) is 16 (step S813). If the edge counter (edge_counter) is not 16, control returns. If the edge counter (edge_counter) is 16, indicating that eight sprocket holes for one film frame has passed, the edge counter (edge_counter) is set to 0 to start counting the leading and trailing edges of the film pulses generated by the sprocket holes of the subsequent film frame (step S814). Subsequently, the film-frame-number counter (ee_film_counter) is decreased by 1 (step S815), and control returns.

If it is detected at step S804 that the level of the current film pulse is not high, it is determined whether the level of the previous film pulse is high (step S807). If the level of the previous film pulse is not high, indicating that the level of the film pulse remains to be low, control returns Tf the level of the previous film pulse is high, indicating that the trailing edge of film pulse has been detected, the pulse-width measuring counter (edge_width_time) at this moment is stored as a high-pulse width or high-pulse duration (high_edge_width_time) (step S808) and subsequently control proceeds to the operation at step S809.

Figure 15:
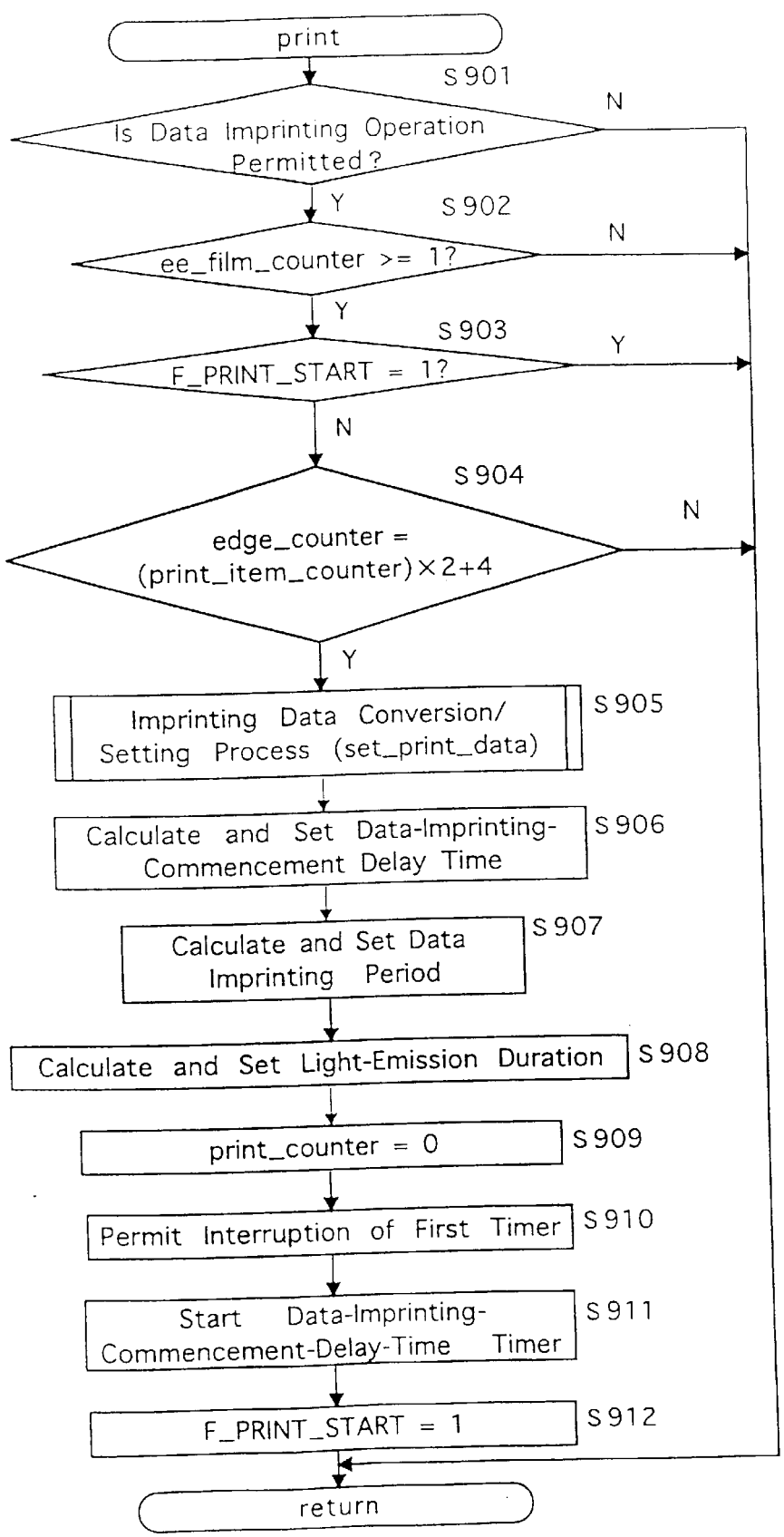
FIG. 15 is a flow chart of the data imprinting process shown in FIG. 13.

The data imprinting process performed at step S705 will be hereinafter discussed with reference to FIGS. 15 and 19. FIG. 15 shows a flow chart of the data imprinting process. In the data imprinting process, firstly it is determined whether the data imprinting operation, in which photographic data is imprinted on the film 14, is permitted by checking the ON/OFF state of the data-imprinting permission switch 54 (step S901). If it is determined that the data imprinting operation is not permitted, it is not necessary to imprint any data on the film 14, and control returns. If it is determined that the data imprinting operation is permitted, it is determined whether the film-frame-number counter (ee_film_counter) is 1 or more (step S902). If the film-frame-number counter (ee_film_counter) is less than 1, control returns. If the film-frame-number counter (ee_film_counter) is 1 or more, it is determined whether the data-imprinting-start flag (F_PRINT_START) is 1, i.e., whether the data imprinting operation is now in operation (step S903).

If it is determined at step S903 that the data-imprinting-start flag (F_PRINT_START) is 1 (i.e., photographic data is currently being imprinted), control returns. If it is determined that the data-imprinting-start flag (F_PRINT_START) is not 1, it is determined whether the following equation (1) is satisfied (step S904):

$$edge\_counter=(print\_item\_counter \times 2)+4 \qquad (1).$$

wherein "print_item_counter" represents the number which indicates the order of the imprinting data item for each film frame. For instance, in FIG. 19, if AV (Aperture Value) data is imprinted on the film 14 between the third sprocket hole and the fourth sprocket hole, "edge_counter" is six since "print_item_counter" is one. Namely, AV data is imprinted on the film 14 between the third sprocket hole and the fourth sprocket hole after six edges of the film pulses are counted. If it is determined at step S904 that the edge counter (edge_counter) does not satisfy the aforementioned equation (1), control returns. In the case that the edge counter (edge_counter) satisfies the aforementioned equation (1), the imprinting data conversion/setting process is performed (step S905). In the imprinting data conversion/setting process, the photographic data stored in the EEPROM 51 at step S202 is converted into actual data which is to be imprinted on the film 14.

After the imprinting data conversion/setting process, a data-imprinting-commencement delay time and a data imprinting period (the cycle "F" shown in FIG. 20) are determined by calculation in accordance with the determined high pulse width (high_edge_width_time) and Reference Delay Time or Reference Period which is stored in the EEPROM 51 (steps S906 and S907).

Reference Delay Time corresponds to the sum of the first and second delay times "C" and "D" shown in FIG. 19, and is determined so that photographic data starts to be imprinted from a predetermined position at a predetermined reference film speed. Reference Delay Time is predetermined to be written into the EEPROM 51. Reference Period is determined to keep the width of each imprinted character pattern exposed on film constant at the predetermined reference film speed. Reference Period is pre-stored in the EEPROM 51. After the operation at step S907, the light-emission duration ("G" shown in FIG. 20) of the character generator 11 for each column of a matrix of seven dots by five dots is determined in accordance with the ISO speed information of the film 14 (step S908). Subsequently, a data-imprinting-dot counter (print counter) is set to 0 (step S909). The data-imprinting-dot counter represents the column number (0 through 22nd as shown in FIG. 20) of the characters imprinted on the film 14 between two adjacent sprocket holes thereof.

Subsequently, an interrupt of a data imprinting period timer (i.e. first timer) is permitted (step S910). The first timer makes an interruption every "F" period passed to turn on imprint LED, as understood from the later description of first timer interruption process. A data-imprinting-commencement-delay-time timer which delays the commencement of data-imprinting between two adjacent sprocket holes by the data-imprinting-commencement delay time determined in the operation at step S906 starts (step S911), and the data-imprinting-start flag (F_PRINT_START) is set to 1 (step S912). Thereafter, control returns.

Figure 16:
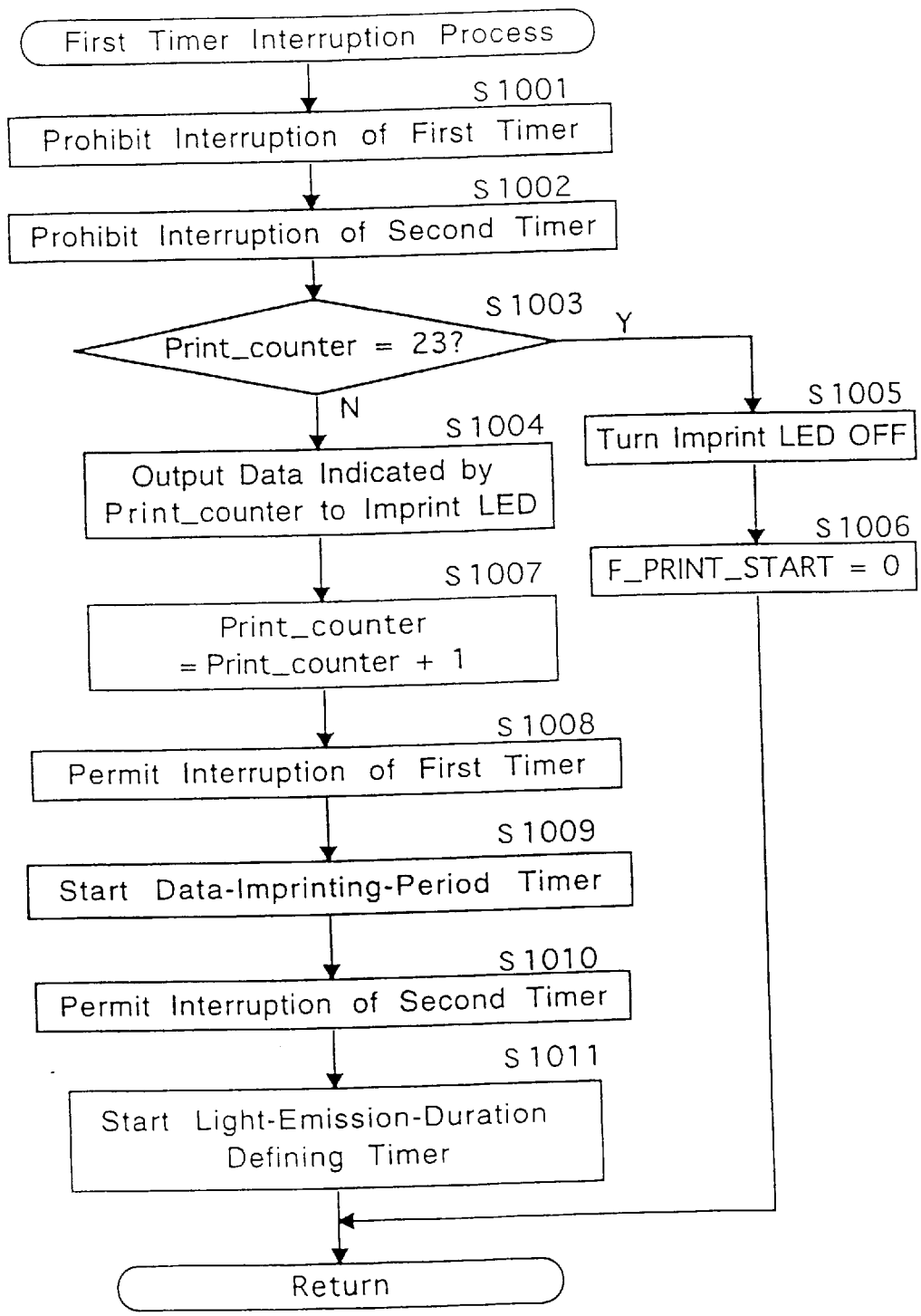
FIG. 16 is a flow chart of the first-timer interruption process.

The first-timer interruption process will be hereinafter discussed with reference to FIG. 16 which shows a flow chart thereof. This subroutine is an interruption routine which allows the character generator 11 emit light to imprint data after interruption of the first timer is permitted at step S910 shown in FIG. 15. In the first-timer interruption process, firstly, interruption of the first timer is prohibited (step S1001) and interruption of a light emission duration defining timer (i.e. second timer) is also prohibited (step S1002). The second timer makes interroption every "G" period passed to turn off imprint LED. Subsequently, it is determined whether the data-imprinting-dot counter (print_counter) is 23 (step S1003). In the present embodiment, a maximum of four characters can be imprinted in each area between two adjacent sprocket holes on the film 14 (see FIG. 20) while each character is formed by a matrix of seven dots by five dots, namely, five columns each consisting of seven dots. Between two adjacent characters there is a space corresponding to one column, so that the width of four characters imprinted in the area between two adjacent sprocket holes corresponds to twenty three columns or dots. Accordingly, for each photographic data imprinted on the film 14 between two adjacent sprocket holes thereof, all the twenty three columns are checked one by one.

If it is determined at step S1003 that the data-imprinting-dot counter (print_counter) is 23, indicating that the data-imprinting operation for an area between two adjacent sprocket holes is completed, the character generator 11 is turned OFF (step S1005), and subsequently the data-imprinting-start flag (F_PRINT_START) is set to 0 (step S1006) and control returns. If it is determined at step S1003 that the data-imprinting-dot counter (print_counter) is not 23, the character generator 11 is actuated to emit light in accordance with that corresponding data of the converted data obtained in the operation at step S905 which corresponds to the number indicated by the data-imprinting-dot counter (print_counter) (step S1004).

Subsequently, the data-imprinting-dot counter (print_counter) is increased by one (step S1007), and an interruption of the first timer is permitted (step S1008). Subsequently, a timer (data-imprinting-period timer) for defining the data imprinting period ("F" shown in FIG. 20) determined in the operation at step S907 starts (step S1009), and interruption of the second timer is permitted (step S1010). Subsequently, the timer for defining the light-emission duration ("G" shown in FIG. 20) starts (step S1011), and control returns.

Figure 17:
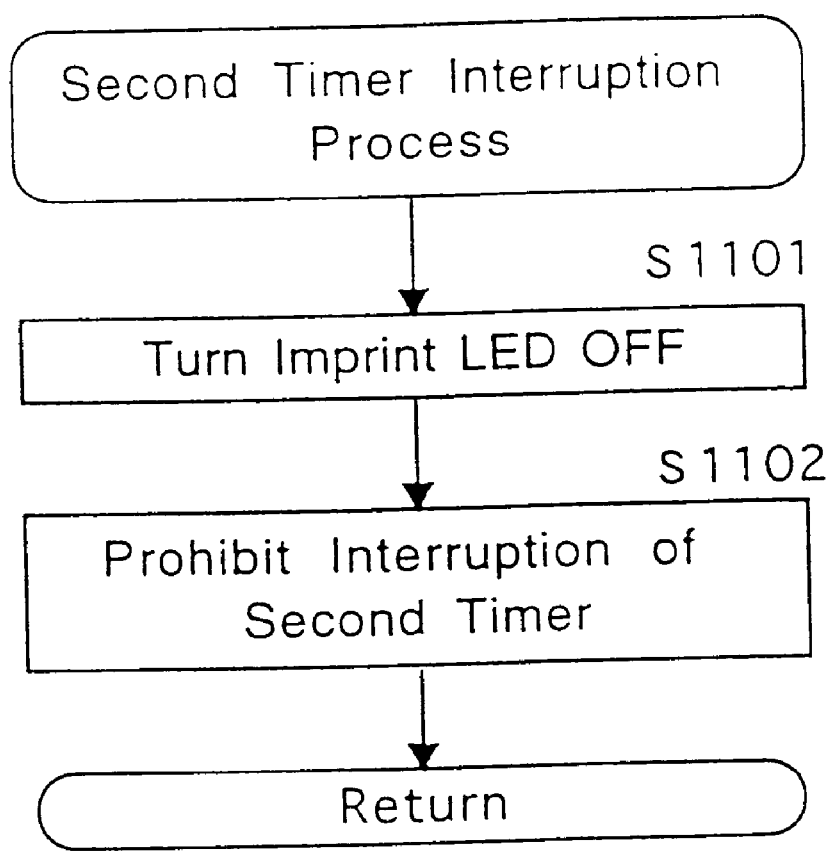
FIG. 17 is a flow chart of the second-timer interruption process.

The second-timer interruption process will be hereinafter discussed with reference to FIG. 17 which shows a flow chart thereof. This subroutine is an interruption routine for having the character generator 11 stop emitting light after the character generator 11 starts emitting light in the subroutine of the first-timer interruption process. In the second-timer interrupt process, firstly the character generator 11 is turned OFF (step S1101) and subsequently an interruption of the second timer is prohibited (step S1102). Thereafter control returns.

Figure 18:
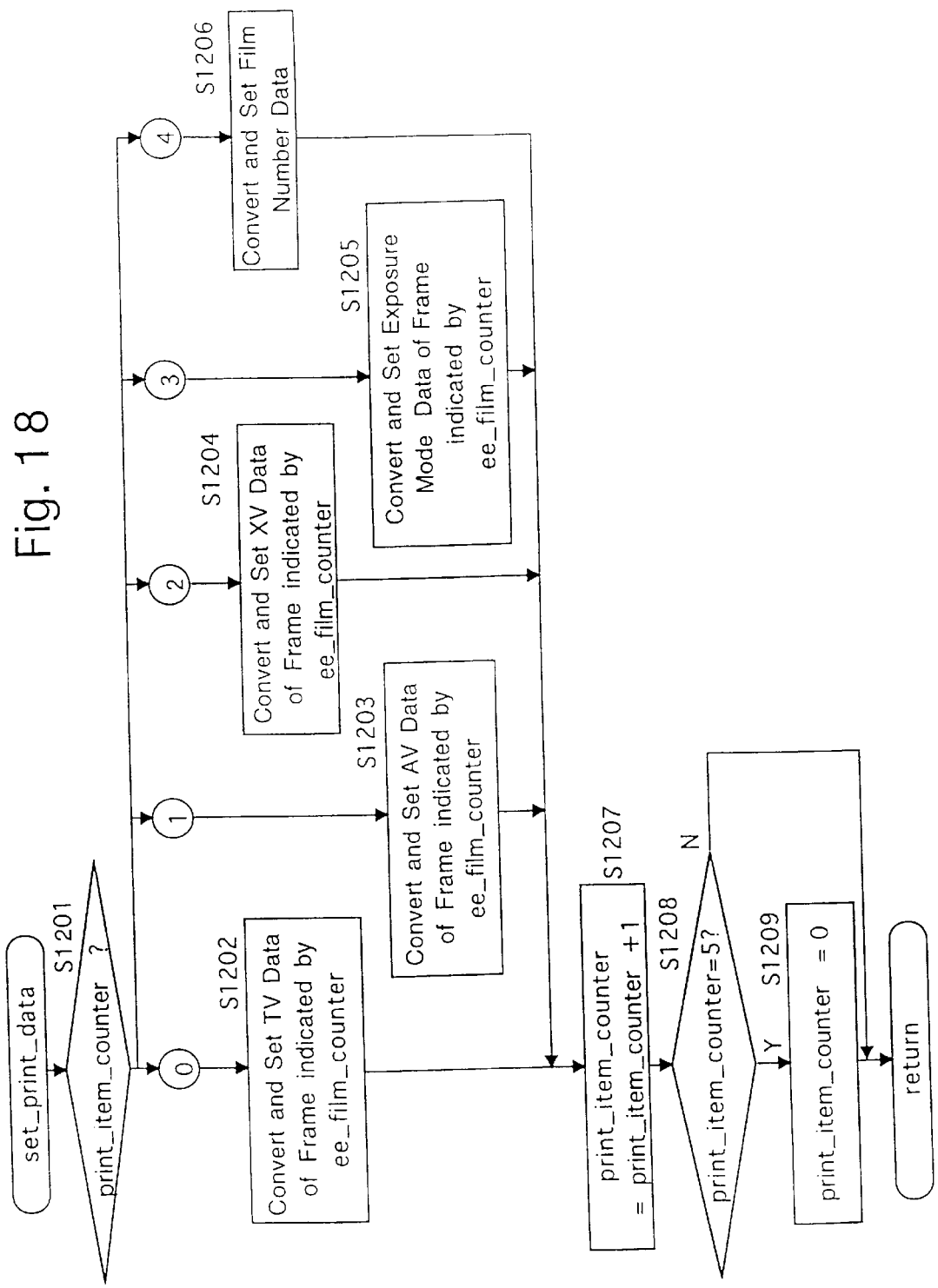
FIG. 18 is a flow chart of the imprinting data conversion/setting process of the flow chart shown in FIG. 15.

The imprinting data conversion/setting process at step S905 will be hereinafter discussed with reference to FIG. 18 which shows a flow chart thereof. In this process, firstly the data-item counter (print_item_counter) is checked (step S1201). If the data-item counter is 0, TV (Time Value) data of the film frame indicated by the film-frame-number counter (ee_film_counter) in the photographic data stored in the EEPROM 51 at step S202 is converted and prepared for being imprinted on the film 14 (step S1202). If the data-item counter is 1, similar to the case where the data-item counter is 0, AV (Aperture Value) data of the film frame indicated by the film-frame-number counter (ee_film_counter) in the photographic data stored in the EEPROM 51 at step S202 is converted and prepared for being imprinted on the film 14 (step S1203). Likewise, if the data-item counter is 2, XV (Exposure Compensation Value) data of the film frame indicated by the film-frame-number counter (ee_film_counter) in the photographic data stored in the EEPROM 51 at step S202 is converted and prepared for being imprinted on the film 14 (step S1204). Likewise, if the data-item counter is 3, Exposure Mode data of the film frame indicated by the film-frame-number counter (ee_film_counter) in the photographic data stored in the EEPROM 51 at step S202 is converted and prepared for being imprinted on the film 14 (step S1205). Likewise, if the data-item counter is 4, Film Number data in the photographic data stored in the EEPROM 51 at step S202 is converted and prepared for being imprinted on the film 14 (step S1206).

After the data converting operation at any one of steps S1202 through S1206, the data-item counter (print_item_counter) is increased by one in order to perform the imprinting data conversion/setting process for the subsequent data item (step S1207). Subsequently, it is determined whether the data-item counter (print_item_counter) is 5 (step S1208). If the data-item counter (print_item_counter) is not 5, indicating that there remains some photographic data which is to be imprinted, control returns. If the data-item counter (print_item_counter) is 5, indicating that there remains no more photographic data which is to be imprinted, the data-item counter (print_item_counter) is set to 0 (step S1209). Subsequently, control returns.

The process from the operation in which photographic data (Time Value TV, Aperture Value AV, Exposure Compensation Value XV and Exposure Mode) is stored into respective addresses for the current Film number in the EEPROM 51 until the photographic data starts to imprint on the film in the rewinding operation will be hereinafter discussed briefly with reference to FIGS. 7 through 14. Firstly, in the release process, the photographic data is written into the EEPROM 51 (step S202). Subsequently, the winding process is performed (step S206). If the film end is detected in the middle of the winding process (step S308;Y), the wind-time-out flag (wind_time_out) is set to 1 (step S309). Subsequently the winding process (FIG. 11) is performed (step S310). In this process, the film-wind-control-status counter (film_wind_status) is set to 5 (step S1305) since the wind-time-out flag (wind_time_out) is set to 1, while the film-winding completion flag (F_FILM_WIND_END) is set to 1 (step S1330). If the film-winding completion flag (F_FILM_WIND_END) is set to 1, control proceeds to the process at step S313 from step S306 in the loop from steps S303 to S312 in FIG. 8 to thereby perform the sub-routine shown in FIG. 12. In this sub-routine, in the operation at step S604, the film-end-edge number (ee_film_end_edge), which indicates the number of edges of the film pulses generated within the last inch of the film 14 from the trailing edge of the last frame to the film end, is written into the EEPROM 51 as a numerical value of the edge counter (edge_counter) at that moment.

Thereafter, control returns to the release process shown in FIG. 7. Subsequently, control proceeds from step S207 to step S208 to perform the rewind process shown in FIG. 13. In this process, the process at step S704 (i.e., the sub-routine shown in FIG. 14 in which the edges of the film pulses are counted) is repeatedly performed by the loop from step S704 to step S708. This sub-routine shown in FIG. 14 is repeatedly performed until the film-end-edge number (ee_film_end_edge), which is stored in the EEPROM 51 at the time the winding of the film 14 reaches the film end, becomes 0 through the operations at steps S810 and S812.

Once the film-end-edge number (ee_film_end_edge) is 0, indicating that the trailing edge of the last frame has been detected, the CPU 34 starts counting the edges of the film pulses from the trailing edge and subsequently starts imprinting the photographic data.

In the illustrated embodiment, although the photographic data is imprinted on film between two adjacent sprocket holes, it can be understood by those skilled in the art that the present invention may be applied to the case where the photographic data is imprinted on film in any other area.

In the illustrated embodiment, although the mechanical film switch 58 is used to detect consecutive edges of sprocket holes, it can be understood by those skilled in the art that the mechanical film switch 58 may be replaced by a photosensor (e.g., a photo-reflector).

As can be understood from the foregoing, according to the present invention, since the camera is provided with a device which precisely detects the amount of movement of the last inch of the film 14 which extends from the trailing edge of the last frame to the film end, the position of each sprocket hole relative to a corresponding film frame can be precisely detected. Therefore, the device is suitable for the case where photographic data is imprinted on film in a narrow area between two adjacent sprocket holes thereof.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having a data imprinting function, comprising:
   a motorized film transport device for winding and rewinding a film having consecutive sprocket holes;
   a sprocket-hole detecting device which detects that each of said sprocket holes passes a predetermined position;
   a memory in which photographic data of a frame of said film is stored at a shutter release;
   a data imprinting device which reads out one of said photographic data stored in said memory therefrom to imprint one character of said photographic data on a corresponding frame of said film between two adjacent sprocket holes of said corresponding frame;
   a film moving amount detector for detecting an amount of movement of part of said film which extends from the trailing edge of the last frame of said film to the end of said film, in accordance with detection of said sprocket-hole detector; wherein said amount of movement, which is detected by said film moving amount detector, is stored in said memory;
   a frame edge detector which detects said trailing edge of said last frame when said film is rewound by said motorized film transport device in accordance with said amount of movement stored in said memory,
   wherein said data imprinting device starts imprinting each of said photographic data stored in said memory on a corresponding frame of said film with reference to said trailing edge of said last frame detected by said frame edge detector, in accordance with detection of said sprocket-hole detector.

2. The camera according to claim 1, wherein said sprocket-hole detector detects that each of said sprocket holes passes said predetermined position by detecting the consecutive edges of said sprocket holes.

3. The camera according to claim 1, wherein said data imprinting device determines a position of commencement of imprinting said each of said photographic data with reference to said trailing edge of said last frame detected by said frame edge detector, in accordance with said amount of movement stored in said memory.

4. The camera according to claim 1, further comprising a counter for counting said sprocket holes detected by said sprocket-hole detector;
   wherein said film moving amount detector detects said amount of movement of said part of said film in accordance with said number of said sprocket holes counted by said counter.

5. The camera according to claim 1, wherein said memory comprises a non-volatile memory.

6. The camera according to claim 1, wherein said film moving amount detector determines that said film is fully wound up to said end of said film when said film is rewound by said motorized film transport device after said shutter release if said sprocket-hole detector only detects a number of said sprocket holes which is fewer than a predetermined number of said sprocket holes provided on each frame of said film within a predetermined period of time.

7. The camera according to claim 1, further comprising a film speed detecting device which detects the speed of said film;
   wherein said data imprinting device determines a position of commencement of imprinting said each of said photographic data in accordance with the time of detection of said sprocket-hole detector and said film speed detected by said film speed detecting device.

8. The camera according to claim 1, wherein said sprocket-hole detector comprises a sprocket having a plurality of projections engageable with said sprocket holes.

9. The camera according to claim 1, wherein said data imprinting device comprises an LED light emitter having an array of multiple-dots.

* * * * *